US012812503B2

(12) United States Patent
Li et al.

(10) Patent No.: US 12,812,503 B2
(45) Date of Patent: Nov. 24, 2026

(54) INFORMATION TRANSMISSION METHOD, INFORMATION RECEPTION METHOD AND APPARATUSES THEREOF AND SYSTEM

(71) Applicant: 1FINITY Inc., Kawasaki (JP)

(72) Inventors: Guorong Li, Beijing (CN); Lei Zhang, Beijing (CN); Xin Wang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 276 days.

(21) Appl. No.: 18/637,775

(22) Filed: Apr. 17, 2024

(65) Prior Publication Data

US 2024/0292313 A1 Aug. 29, 2024

Related U.S. Application Data

(63) Continuation of application No. PCT/CN2021/124652, filed on Oct. 19, 2021.

(51) Int. Cl.

| | |
|---|---|
| ***H04W 40/22*** | (2009.01) |
| ***H04W 76/27*** | (2018.01) |
| ***H04W 88/04*** | (2009.01) |

(52) U.S. Cl.

CPC ........... *H04W 40/22* (2013.01); *H04W 76/27* (2018.02); *H04W 88/04* (2013.01)

(58) Field of Classification Search

CPC ..... H04W 40/22; H04W 76/27; H04W 88/04; H04W 92/18

USPC ........................................................ 370/328

See application file for complete search history.

(56) References Cited

U.S. PATENT DOCUMENTS

| | | | | |
|---|---|---|---|---|
| 12,063,591 | B2 * | 8/2024 | Chang | H04W 88/04 |
| 12,089,202 | B2 * | 9/2024 | Sun | H04W 72/542 |
| 12,108,459 | B2 * | 10/2024 | Latheef | H04W 76/18 |
| 2016/0198516 | A1 * | 7/2016 | Kim et al. | H04W 76/14 370/312 |
| 2018/0092027 | A1 * | 3/2018 | Sheng | H04W 48/08 |
| 2021/0212104 | A1 * | 7/2021 | Li | H04L 1/1822 |
| 2021/0282098 | A1 * | 9/2021 | Luo et al. | H04L 5/0053 |
| 2022/0312535 | A1 * | 9/2022 | Wu | H04L 65/1016 |
| 2025/0142432 | A1 * | 5/2025 | Ali | H04W 36/0005 |

FOREIGN PATENT DOCUMENTS

| | | | | |
|---|---|---|---|---|
| CA | 3066655 A1 * | 1/2019 | H04W 36/0005 |
| CN | 111212459 A | 5/2020 | |
| WO | WO-2020087365 A1 * | 5/2020 | H04W 72/23 |

OTHER PUBLICATIONS

Notice of Reasons for Refusal issued by the Japan Patent Office for corresponding Japanese Patent Application No. 2024-522629, mailed on Feb. 12, 2025, with an English translation.

(Continued)

*Primary Examiner* — Mahendra R Patel

(74) *Attorney, Agent, or Firm* — Myers Wolin, LLC

(57) ABSTRACT

An information transmission method, an information reception method and apparatuses thereof and a system. The information transmission method includes: establishing connection with at least one second terminal equipment by a first terminal equipment; transmitting first identification information by the first terminal equipment to a network device, the first identification information being used to indicate a first identifier related to the at least one second terminal equipment.

16 Claims, 18 Drawing Sheets

(56) References Cited

OTHER PUBLICATIONS

Vivo, "Remaining issues on service continuity in L2 relaying", Agenda Item: 8.7.2.2, 3GPP TSG RAN WG2 Meeting# 115-e , R2-2107452, E-Meeting, Aug. 16-27, 2021, cited in JPOA.
Vivo, "Adaptation Layer for L2 SL Relay", Agenda Item: 8.7.2.3, 3GPP TSG RAN WG2 Meeting #115-e, R2-2107451, E-meeting, Aug. 16-27, 2021, cited in JPOA.
OPPO, "[R2 AT115-e][604][Relay] Discussion on Adaptation Layer", Agenda Item: 8.7.2.3, 3GPP TSG RAN WG2 Meeting #115-e, R2-2108947, Electronic Meeting, Aug. 16-27, 2021, cited in JPOA.
Mediatek Inc., "Introduction of Rel-17 Sidelink Relay", Work item code: NR_SL_relay-Core, 3GPP TSG RAN WG2 Meeting #115-e, R2-2108924, Online Meeting, Aug. 16-27, 2021, cited in JPOA.
International Search Report and Written Opinion of the International Searching Authority issued by the China National Intellectual Property Administration for corresponding International Patent Application No. PCT/CN2021/124652, mailed on Jul. 11, 2022, with English translation.
Intel Corporation, "Remaining issues of L2 Relay connection management", Agenda Item: 8.7.2.1, 3GPP TSG-RAN WG2 Meeting #115e, R2-2107306, E-meeting, Aug. 16-27, 2021.

* cited by examiner

1901 the first terminal equipment transmits information on a sidelink failure to the network device, the information on a sidelink failure including a destination identifier of at least one second terminal equipment where a sidelink failure occurs, and a second identifier of the second terminal equipment where a sidelink failure occurs and/or a first identifier related to the second terminal equipment where a sidelink failure occurs

Fig. 19

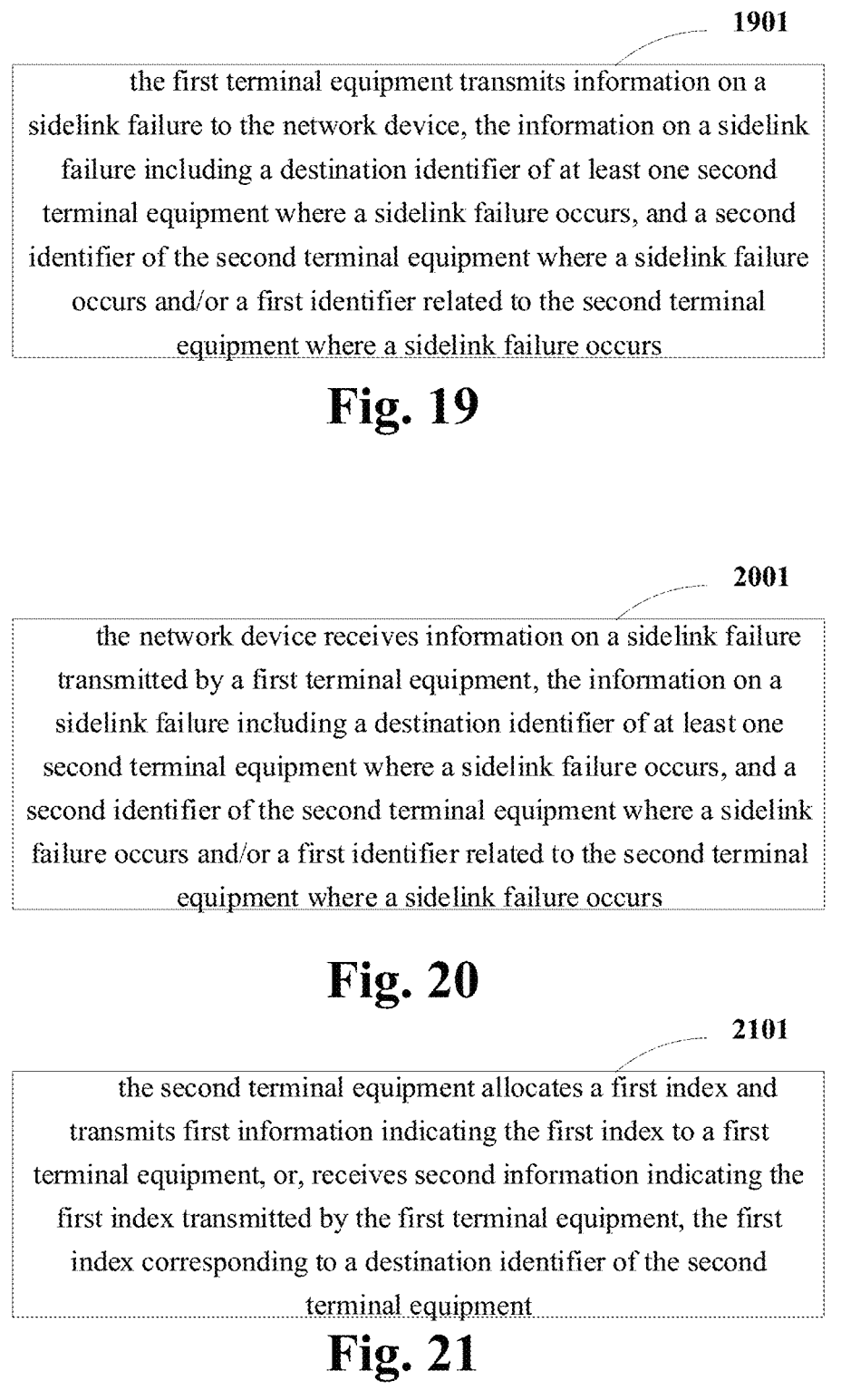

2001 the network device receives information on a sidelink failure transmitted by a first terminal equipment, the information on a sidelink failure including a destination identifier of at least one second terminal equipment where a sidelink failure occurs, and a second identifier of the second terminal equipment where a sidelink failure occurs and/or a first identifier related to the second terminal equipment where a sidelink failure occurs

Fig. 20

2101 the second terminal equipment allocates a first index and transmits first information indicating the first index to a first terminal equipment, or, receives second information indicating the first index transmitted by the first terminal equipment, the first index corresponding to a destination identifier of the second terminal equipment

Fig. 21

INFORMATION TRANSMISSION METHOD, INFORMATION RECEPTION METHOD AND APPARATUSES THEREOF AND SYSTEM

CROSS-REFERENCE TO RELATED APPLICATION

This application is a continuation application of International Application PCT/CN2021/124652 filed on Oct. 19, 2021, and designated the U.S., the entire contents of which are incorporated herein by reference.

TECHNICAL FIELD

This disclosure relates to the field of communication technologies.

BACKGROUND

In an existing communication network, a terminal equipment is connected to a network part via a Uu interface, and communicates with other terminal equipment via a PC5 interface. Currently, research on sidelink (SL) relay has begun in R17. FIG. 1 shows a schematic diagram of a sidelink relay scenario. In scenario 1, a remote terminal equipment (UE) is not within coverage of a base station or cell, and a relay terminal equipment (UE) is within the coverage of the base station or cell. In scenario 2, both the remote terminal equipment and the relay terminal equipment are within the coverage of the base station or cell. In scenario 3, the remote terminal equipment and the relay terminal equipment are within coverage of different base stations or cells. NR (New radio) Uu is used on a Uu link of the relay UE, and an NR sidelink is used on PC5 between the relay UE and the remote UE.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY OF THE DISCLOSURE

In order to support SL relay communication, an adaptation layer is introduced in a protocol stack of R17 SL relay. In a header of the adaptation layer, an identifier related to a remote terminal equipment and an identifier of its Uu radio bear may be added, so that a serving base station of a relay terminal equipment may recognize a remote terminal equipment. However, there is currently no solution for how to allocate identifiers related to a remote terminal equipment.

In order to solve at least one of the above problems or other similar problems, embodiments of this disclosure provide an information transmission method, an information reception method and apparatuses thereof and a system for the same.

According to one aspect of the embodiments of this disclosure, there is provided an information reception apparatus, configured in a first terminal equipment, wherein the apparatus includes:

- a processing unit configured to establish connection with at least one second terminal equipment;
- a first transmitting unit configured to transmit first identification information to a network device, the first identification information being used to indicate a first identifier related to the at least one second terminal equipment; and
- a first receiving unit configured to receive second identification information transmitted by the network device, the second identification information being used to indicate a second identifier of the at least one second terminal equipment.

According to another aspect of the embodiments of this disclosure, there is provided an information transmission apparatus, applicable to a network device, wherein the apparatus includes:

- a third receiving unit configured to receive first identification information transmitted by a first terminal equipment, the first identification information being used to indicate a first identifier related to at least one second terminal equipment connected to the first terminal equipment; and
- a third transmitting unit configured to transmit second identification information to the first terminal equipment, the second identification information being used to indicate a second identifier of at least one second terminal equipment.

According to a further aspect of the embodiments of this disclosure, there is provided a communication system, including the network device as described in the above one aspect and/or the first terminal equipment as described in the other aspect.

An advantage of the embodiments of this disclosure exists in that the identifier of the second terminal equipment may be configured by the serving network device of the first terminal equipment, so that the first terminal equipment may use the identifier in forwarding the data (such as an RRC message or user plane data) of the second terminal equipment, which is conducive to correctly recognizing the RRC message or user plane data of the second terminal equipment by the network device.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/comprising/including/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 19 is a schematic diagram of the information transmission method of an embodiment of this disclosure;

FIG. 20 is a schematic diagram of the information reception method of an embodiment of this disclosure;

FIG. 21 is a schematic diagram of an information reception and transmission method of an embodiment of this disclosure;

DETAILED DESCRIPTION OF THE DISCLOSURE

Figure 1:
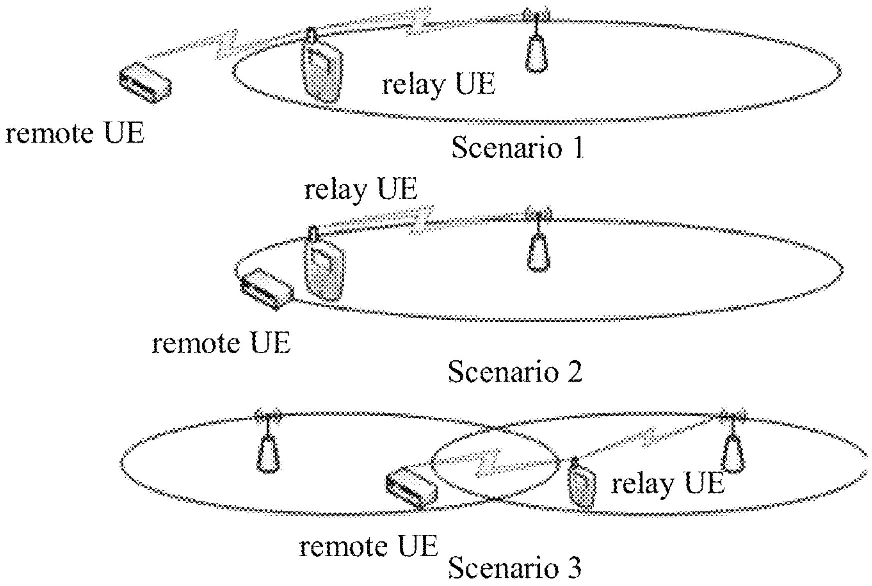
FIG. 1 is schematic diagram of an application scenario of a remote UE and a relay UE.

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following devices: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" refers to, for example, an equipment accessing to a communication network and receiving network services via a network device, and may also be referred to as "a terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

In the embodiments of this disclosure, a relay UE represents a terminal equipment able to communicate directly with a network device and perform relay (UE-to-network relay UE), and a remote UE represents a terminal equipment able to communicate with a network device via relay of a relay UE.

In the embodiments of this disclosure, signaling radio bearers (SRBs) include SRB0, SRB1, SRB2, etc. The signaling radio bearers are radio bearers used to transmit RRC and NAS messages. SRB0 transmits RRC a message (such as an RRC setup request or RRC setup or RRC reject or an RRC re-establishment request or an RRC resume request) using a common control channel (CCCH) logical channel. SRB1 transmits an RRC message (which may include a piggybacked NAS message) and an NAS message before SRB2 is set up, and uses a dedicated control channel (DCCH) logical channel. SRB2 transmits an NAS message and an RRC message containing a log measurement message, and uses a DCCH logical channel. SRB2 has a lower priority than SRB1 and may be configured by the network after an access stratum (AS) is securely activated.

Figure 2:
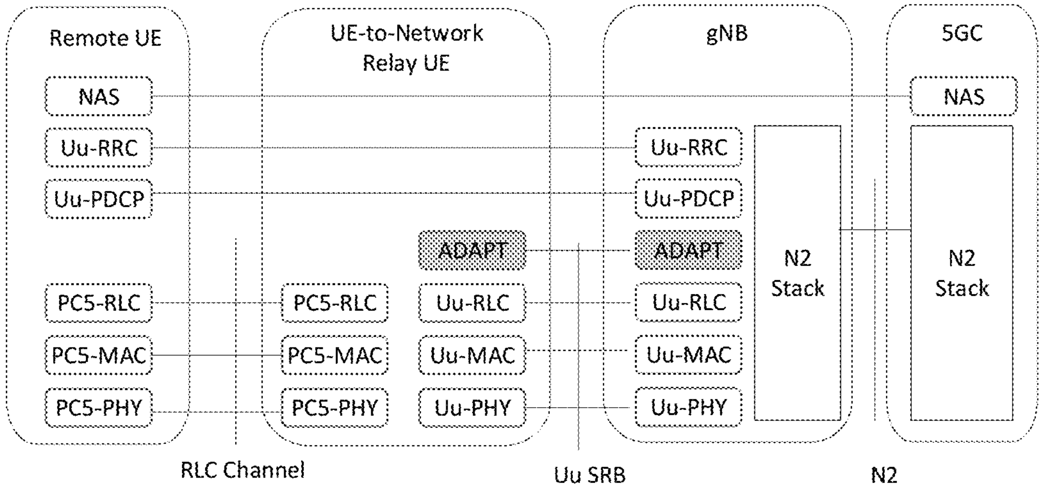
FIGS. 2-4 are schematic diagrams of protocol stacks in a scenario of terminal equipment-network device relay.
Figure 3:
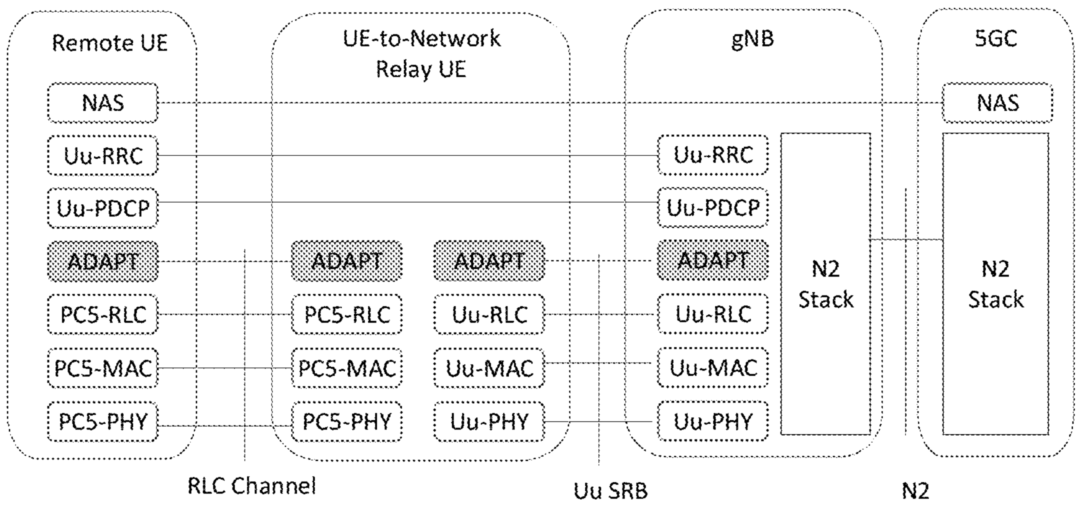
Figure 4:
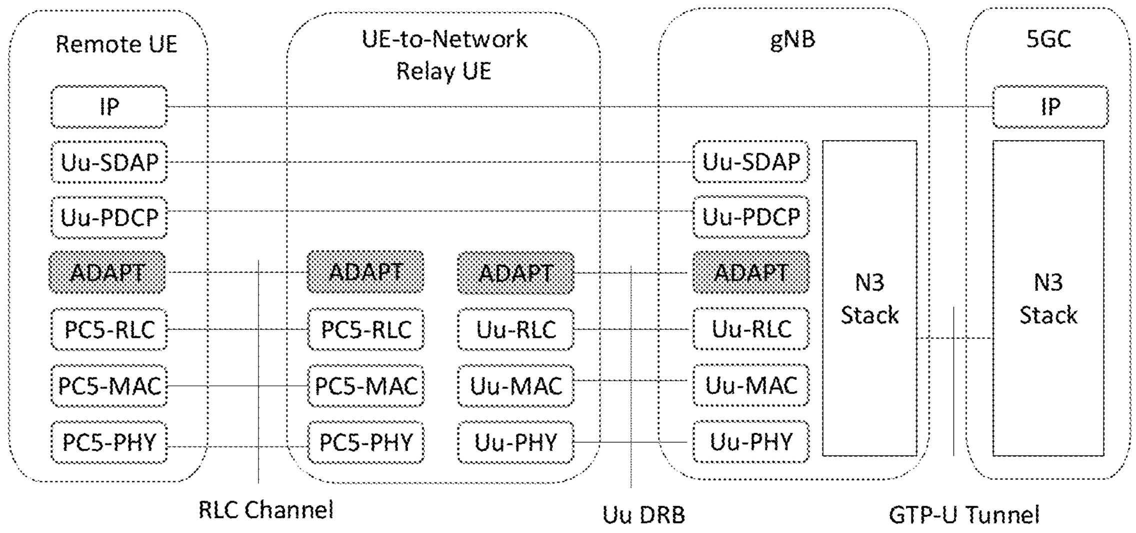

FIGS. 2 and 3 are schematic diagrams of control-plane protocol stacks in a scenario of UE-to-network relay, and FIG. 4 is a schematic diagram of a user-plane protocol stack in a scenario of layer-2 UE-to-network relay. Currently, at a PC5 interface, an adaptive layer (such as ADAPT in the figures) is supported, and is only used for bearer mapping. As shown in FIGS. 3 and 4, at a Uu interface, for uplink and downlink transmissions of non-SRB0 Uu radio bearers of the remote UE, an identifier of the remote UE and identification information of its Uu radio bearers are included in a header of the adaptation layer. As shown in FIG. 2, for uplink and downlink transmissions of SRB0 of the remote UE, the adaptation layer is not present (applicable) at the PC5 interface. At the Uu interface, the adaptation layer is present (applicable) for uplink and downlink transmissions of SRB0 of the remote UE. In addition, the protocol stacks of the relay UE and remote UE at the PC5 interface include physical (PHY) layers, media access control (MAC) layers above the PHY layers (providing packet filtering, logical channel prioritization, scheduling request, data multiplexing and demultiplexing, and mapping between a logical channel and transmission channel, etc.), radio link layer control protocol (RLC) layers above the MAC layers, and radio resource control layer PC5-RRC layers (RRC signaling exchange at the PC5 interface) over the RLC layers, wherein the PHY provides services to the MAC layers in a mode of transmission channels, and the MAC layers provide services to the RLC layers in a mode of logical channels. In addition, the relay UE communicates with a gNB via an NR Uu interface protocol stack, and a non-access stratum (NAS) of the remote UE is equivalent to an NAS in a core network.

Figure 5:
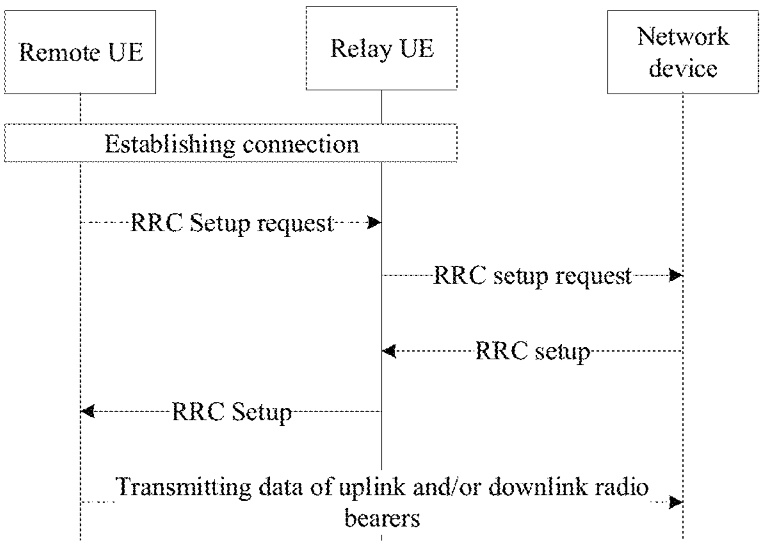
FIG. 5 is a schematic diagram of establishing connection to perform uplink and downlink transmissions in the scenario of terminal equipment-network device relay.

FIG. 5 is a schematic diagram of establishing connection to perform uplink and downlink transmissions in the scenario of UE-network relay. As shown in FIG. 5, after establishing connection with the relay UE, the remote UE establishes RRC connection with a network device via the relay UE, and then performs uplink and downlink transmissions. Currently, a first RRC message (such as an RRC setup request or an RRC re-establishment request or an RRC resume request) transmitted by the remote UE is carried on SRB0, which uses the adaptation layer at the Uu interface, and an identifier related to a remote terminal equipment may be added to the header of the adaptation layer, so that the serving base station of the relay terminal equipment may recognize the remote terminal equipment. However, there is currently no solution for how to allocate an identifier related to a remote terminal equipment.

In the embodiments of this disclosure, the remote terminal equipment needs to be added with an identifier related to the remote terminal equipment and an identifier of its Uu radio bearer in the header of the adaptation layer during an initial access process or a switching process, so that the serving base station of the relay terminal equipment (an initially accessed base station or a target base station after switching) may recognize the remote terminal equipment. How to allocate the identifier related to the remote terminal equipment during the initial access process shall be described below with reference to the embodiments of the first and second aspect and how to allocate the identifier related to the remote terminal equipment during the switching process shall be described below with reference to the embodiments of the third to fifth aspects.

Various implementations of this disclosure shall be described below with reference to the accompanying drawings. These implementations are illustrative only, and are intended to limit this disclosure.

Embodiment of the First Aspect

The embodiment of this disclosure provides an information transmission method, applicable to a side of a first terminal equipment. The first terminal equipment may be relay UE, and a second terminal equipment may be a remote UE.

Figure 6:
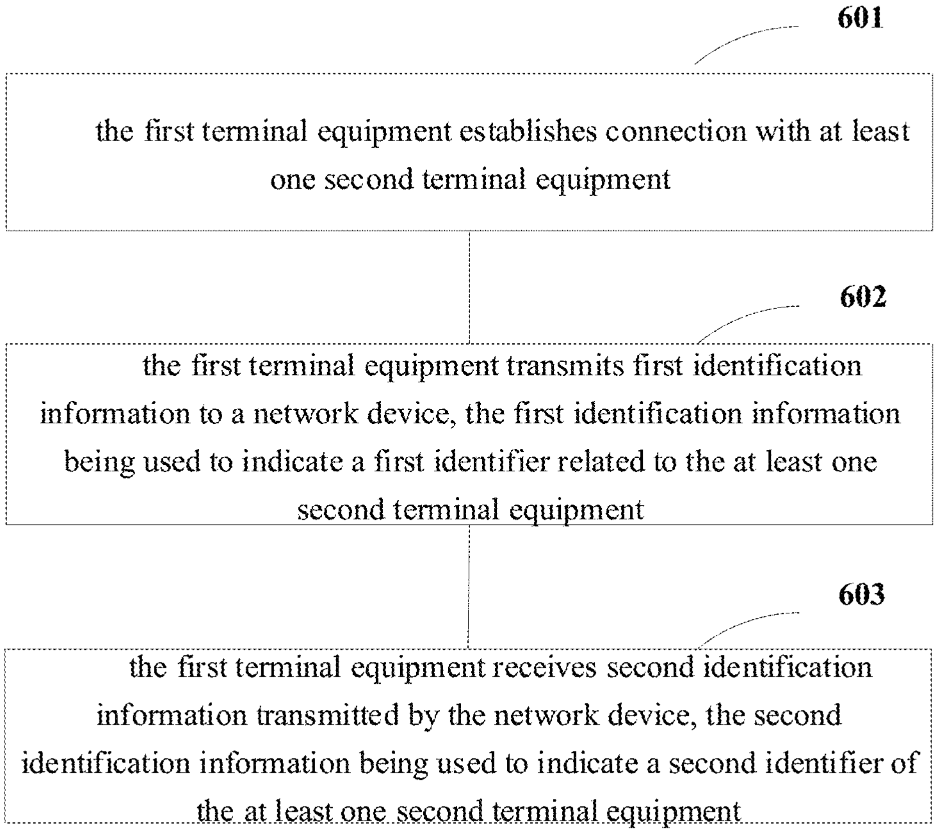
FIG. 6 is a schematic diagram of the information transmission method of an embodiment of this disclosure.

FIG. 6 is a schematic diagram of the information transmission method of the embodiment of this disclosure. As shown in FIG. 6, the method includes:

601: the first terminal equipment establishes connection with at least one second terminal equipment; and

602: the first terminal equipment transmits first identification information to a network device, the first identification information being used to indicate a first identifier related to the at least one second terminal equipment.

In some embodiments, the first terminal equipment establishing connection with at least one second terminal equipment may include the second terminal equipment performs relay discovery, relay selection or relay reselection, or establishing a unicast link between the first terminal equipment and the second terminal equipment. This connection is PC5 connection or sidelink (SL) connection, such as PC5-RRC connection or PC5-AS (access stratum) connection or a PC5 unicast link, and reference may be made to existing techniques for the relay discovery procedure, relay selection or relay reselection procedure and the procedure of establishing a unicast link, which shall not be repeated herein any further.

In some embodiments, the first terminal equipment may establish connection with one or more second terminal equipment, and in a procedure of establishing connection with each second terminal equipment, the first terminal equipment may obtain a first identifier related to the second terminal equipment. The first identifier may be a destination ID of the second terminal equipment, such as a layer-2 ID (L2 ID), or in order to save overhead, the first identifier may also be a first index shorter than the destination identifier, and represent an identifier of the second terminal equipment in communicating in a PC5 interface (communicating with the first terminal equipment), the identifier being used to explicitly indicate the second terminal equipment; and/or, the first identifier may also be an identifier of the PC5 unicast link (PC5 unicast link ID) between the first terminal equipment and the second terminal equipment. For example, one or more PC5 unicast links may be established between the first terminal equipment and one second terminal equipment, and a PC5 unicast link ID uniquely identifies a PC5 unicast link, and corresponds to the destination identifier or a first index of the second terminal equipment, that is, implicitly indicating (the destination identifier or first index of) the second terminal equipment; and/or, the first identifier may also be an identifier (PC5-RRC connection ID) of the PC5-RRC connection between the first terminal equipment and the second terminal equipment. For example, one or more PC5 RRC connections may be established between the first terminal equipment and a second terminal equipment, and a PC5-RRC connection ID uniquely identifies a PC5-RRC connection, and correspond to the destination identifier or the first index of the second terminal equipment, that is, implicitly indicating (the destination identifier or first index of) the second terminal equipment; and/or, the first identifier may be a pair(s) of source layer-2 ID and destination L2 ID between the first terminal equipment and the second terminal equipment, such as a pair of an L2 ID of the first terminal equipment and an L2 ID of the second terminal equipment, and the embodiment of this disclosure is not limited thereto.

For example, the first identifier may be carried by a sidelink signaling message or sidelink RRC message between the first terminal equipment and the second terminal equipment; for example, the sidelink signaling message may be a discovery message or a direct communication request message or a direct communication accept message, and the sidelink RRC message may be an RRC reconfiguration sidelink (RRCReconfigurationSidelink) message or an RRC reconfiguration complete sidelink (RRCReconfigurationCompleteSidelink) message, etc., which shall not be enumerated herein any further. In some embodiments, if the first index is used to replace transmission represented by a destination, the first terminal equipment or the second terminal equipment needs further to pre-allocate the first index, and reference may be made to the embodiment of the sixth aspect for allocation of the first index, which shall not be repeated herein any further.

In some embodiments, the first identification information is used to indicate a first identifier related to one second terminal equipment establishing connection with the first terminal equipment. The second terminal equipment is a terminal equipment newly establishing connection with the first terminal equipment, or the first identification information is used to indicate first identifiers related to all second terminal equipment establishing connection with the first terminal equipment. A mode for carrying the first identification information and a format thereof shall be explained in detail in (I) and (II) below.

In some embodiments, the method may further include:

603: the first terminal equipment receives, second identification information transmitted by the network device, the second identification information being used to indicate a second identifier of the at least one second terminal equipment.

In some embodiments, after receiving the first identification information, the network device may allocate the second identifier according to the first identification information, generate second identification information, and notify the first terminal equipment of the second identifier (identified by and learnt from the first identification information) allocated to the at least one second terminal equipment. The second identifier is a local/temporary identifier of the second terminal equipment, which may be included in a header of a Uu interface adaptation layer. A mode for carrying the second identification information and a format thereof shall be explained in detail in (I) and (II) below.

In some embodiments, the local/temporary identifier represents an identifier of the second terminal equipment in communication in a Uu interface, and includes at least one of the following:

1) a second index of the second terminal equipment, which is used to uniquely identify a second terminal equipment having a connection relationship with the first terminal equipment, that is, the second index is unique within the second terminal equipment having connection (such as PC5-RRC connection) with the first terminal equipment. For example, if the first terminal equipment is connected to three second terminal equipment, three second indices may be used to identify the three second terminal equipment. One second index is used to identify one second terminal equipment, which may be represented by, for example, n bits, where, n is greater than or equal to 3 and is less than or equal to 8, or may be represented by an integer (such as any integer from 0 to 16);
2) a cell radio network temporary identifier (C-RNTI) of the second terminal equipment; and
3) a part of the destination identifier of the second terminal equipment; for example, the destination identifier is represented by 24 bits, and the second identifier may be a part of the 24 bits, such as higher X bits or lower X bits, etc., where, X may be an integer ranging from 2 to 5, etc., and this embodiment is not limited thereto.

In some embodiments, in order that the first terminal equipment determines a correspondence between the first identifier and the second identifier, that is, in order that the first terminal equipment learns a second terminal equipment (first identifier) to which the second identifier allocated by the network device corresponds, the network device may explicitly or implicitly indicate the correspondence, for example, the network device may simultaneously indicate the first identifier corresponding to at least one second identifier while transmitting the second identification information (explicitly indicating); or, an order of arrangement of second identifiers in the second identification information is identical to an order of presence of the first identifier related to the at least one second terminal equipment in the first identification information (implicitly indicating), the order of presence of the first identifier including an order of presence in the same message, or an order of presence in different messages. For example, when there are a plurality of second terminal equipment that are connected to the first terminal equipment, the first identification information includes first identifiers related to the plurality of second terminal equipment, and an order of presence of the second identifiers corresponds to an order of presence of the first identifiers one to one; or, when the first identification information includes a first identifier related to one second terminal equipment, but the first terminal equipment transmits more than one uplink message and each uplink message carries one first identification information, the order of presence of the second identifiers corresponds to an order of receiving the plurality of uplink messages, that is, corresponding to the order of presence of the first identifier in each uplink message one to one; or, the first identification information includes a first identifier related to one second terminal equipment, and when the network device allocates one second identifier every time it receives a first identifier, and the first terminal equipment transmits next first identification information after receiving one second identifier. A mode for configuring the second identifier shall be explained in detail in (I) and (II) below.

In some embodiments, the method may further include (not shown):

the first terminal equipment uses or stores or reserves the correspondence between the first identifier and the second identifier.

For example, the first terminal equipment may determine a second terminal equipment (first identifier) to which the second identifier allocated by the network device corresponds according to the correspondence explicitly or implicitly indicated by the network device. After receiving the second identification information, the first terminal equipment may use or store or reserve the correspondence between the first identifier and the second identifier, such as for use in subsequent relay transmission of uplink and/or downlink data of the second terminal equipment.

In some embodiments, the first terminal equipment may be in an RRC connected (RRC_CONNECTED) mode, or may be in an RRC idle (RRC_IDLE) mode or an RRC inactive (RRC_INACTIVE) mode, which shall be described below.

(I) The First Terminal Equipment is in an RRC Connected Mode

In some embodiments, as the first terminal equipment is in an RRC connected mode, the first terminal equipment may directly transmit an uplink message to the network device. In 602, the uplink message may be used to carry the first identification information, for example, the uplink message may be a sidelink UE information (SUI) message. Following description shall be given by taking the SUI as an example; however, this disclosure is not limited thereto.

In some embodiments, when a first triggering condition is satisfied, the first terminal equipment transmits the first identification information to the network device (or, in other words, when the first triggering condition is satisfied, the first terminal equipment transmits the SUI to the network device), and the first triggering condition includes at least one of the following conditions that: the first terminal equipment establishes connection with the second terminal equipment; a sidelink capability message is transmitted between the first terminal equipment and the second terminal equipment; or the first terminal equipment receives a first RRC message for the second terminal equipment transmitted by the second terminal equipment.

For example, in existing techniques, when sidelink services are interested, transmission of the SUI message may be triggered. In the embodiment of this disclosure, when the first terminal equipment establishes connection with the second terminal equipment and/or a sidelink capability message is transmitted between the first terminal equipment and the second terminal equipment and/or the first terminal equipment receives a first RRC message for the second terminal equipment transmitted by the second terminal equipment, transmission of the SUI message may also be triggered.

For example, after connection is established in operation 601 (as described above), transmission of the SUI message may be triggered;

or, after connection is established, transmission of the SUI message is triggered after the sidelink capability message is transmitted between the first terminal equipment and the second terminal equipment via a PC5-RRC message, wherein it may be that the first terminal equipment notifies the second terminal equipment of the sidelink capability and/or relay capability of the first terminal equipment, or the second terminal equipment notifies the first terminal equipment of the sidelink capability of the second terminal equipment and/or a capability to serve as the second terminal equipment, and this disclosure is not limited thereto;

or, after connection is established and the first terminal equipment receives a first RRC message for the second terminal equipment transmitted by the second terminal equipment, transmission of the SUI message is triggered. The first RRC message may be a first RRC message transmitted by the second terminal equipment to the first terminal equipment after the connection is established, or an RRC message transmitted by using a specific SRB (such as SRB0), or an RRC message transmitted by using specific layer-2 configuration (such as by using layer-2 configuration to which SRB0 corresponds), and the first RRC message for the second terminal equipment refers to that the RRC message is generated by RRC of the second terminal equipment (for uplink), or the RRC message is received or parsed or processed by the RRC of the second terminal equipment (for downlink), for example, the first RRC message includes an RRC setup request, or an RRC re-establishment request, or an RRC resume request message, etc., and this disclosure is not limited thereto.

When the triggering condition is satisfied, in 602, the first terminal equipment may transmit the SUI to the network device, including first identification information. For example, by the SUI by using an abstract syntax notation ASN.1 data format may be expressed as:

```
SidelinkUEInformationNR-r16-IEs ::=   SEQUENCE {
    sl-RxInterestedFreqList-r16        SL-InterestedFreqList-r16      OPTIONAL,
    sl-TxResourceReqList-r16           SL-TxResourceReqList-r16       OPTIONAL,
    sl-FailureList-r16                 SL-FailureList-r16             OPTIONAL,
```

-continued

```
    sl-RemoteUEList-r16              SL-RemoteUEList-r16          OPTIONAL,
    lateNonCriticalExtension         OCTET STRING                 OPTIONAL,
    nonCriticalExtension             SEQUENCE { }                 OPTIONAL
}
SL-RemoteUEList-r16 ::=          SEQUENCE (SIZE (1..maxNrofSL-Dest-r16)) OF SL-RemoteUE-r16
SL-RemoteUE-r16                    SEQUENCE {
    sl-DestinationIdentity-r16 ::=   SL-DestinationIdentity-r16,
}
    or
SidelinkUEInformationNR-r16-IEs ::=  SEQUENCE {
    sl-RxInterestedFreqList-r16      SL-InterestedFreqList-r16    OPTIONAL,
    sl-TxResourceReqList-r16         SL-TxResourceReqList-r16     OPTIONAL,
    sl-FailureList-r16               SL-FailureList-r16           OPTIONAL,
    sl-RemoteUEList-r16              SL-RemoteUEList-r16          OPTIONAL,
    lateNonCriticalExtension         OCTET STRING                 OPTIONAL,
    nonCriticalExtension             SEQUENCE { }                 OPTIONAL
}
SL-RemoteUEList-r16 ::=          SEQUENCE (SIZE (1..maxNrofSL-Dest-r16)) OF SL-
DestinationIdentity-r16
```

In the above embodiment, the first identification information sl-RemoteUEList-r16 includes first identifiers (such as sl-DestinationIdentity-r16) related to all current (one or more) second terminal equipment having established or newly establishing connection. An order of arrangement (presence) of the first identifiers may be according to a temporal order of establishing the connection with the first terminal equipment; however, the embodiment of this disclosure is not limited thereto.

For example, SUI may also be expressed by using an abstract syntax notation ASN.1 data format as:

```
SidelinkUEInformationNR-r16-IEs ::=  SEQUENCE {
    sl-RxInterestedFreqList-r16      SL-InterestedFreqList-r16      OPTIONAL,
    sl-TxResourceReqList-r16         SL-TxResourceReqList-r16       OPTIONAL,
    sl-FailureList-r16               SL-FailureList-r16             OPTIONAL,
    lateNonCriticalExtension         OCTET STRING                   OPTIONAL,
    nonCriticalExtension             SEQUENCE { }                   OPTIONAL
}
SL-TxResourceReqList-r16 ::=         SEQUENCE (SIZE (1..maxNrofSL-Dest-r16)) OF SL-
TxResourceReq-r16
SL-TxResourceReq-r16 ::=             SEQUENCE {
    sl-DestinationIdentity-r16       SL-DestinationIdentity-r16,
    ...
    sl-RemoteUE                      ENUMERATED {True)              OPTIONAL,
    sl-CapabilityInformationSidelink-r16   OCTET STRING
OPTIONAL
}
```

In the above embodiment, the first identification information SL-TxResourceReq-r16 includes first identifiers (such as sl-DestinationIdentity-r16) related to all current second terminal equipment (for example, sl-Remote UE is used to indicate whether a destination ID corresponds to a remote terminal equipment, i.e. a second terminal equipment) having established or newly establishing connection.

In some embodiments, in 603, the second identification information may be carried by a fourth RRC message for the first terminal equipment, wherein the fourth RRC message for the first terminal equipment refers to being received or parsed or processed by the RRC of the first terminal equipment, for example, the fourth RRC message includes an RRC reconfiguration message, or an RRC re-establishment message, or an RRC resume message, etc.

In some embodiments, the fourth RRC message may include second identification information, in which an order of arrangement of the second identifiers is identical to the order of presence of the first identifiers related to at least one second terminal equipment in the first identification information. The order of presence of the first identifiers includes an order of presence in the same SUI, or in different SUI messages. For example, when there are more than one second terminal equipment connected to the first terminal equipment, the first identification information includes first identifiers related to the more than one second terminal equipment, and an order of presence of the second identifiers corresponds to the order of presence of the first identifiers one to one; or, when the first identification information includes one first identifier related to one second terminal equipment, but the first terminal equipment transmits more than one SUI messages and each SUI message carries one first identification information, an order of presence of the second identifier corresponds to the order of presence of the first identifier in each SUI message one to one. Thus, the correspondence between the second identifier and the first identifier is indicated implicitly.

In some embodiments, the fourth RRC message may also indicate the second identifier and the first identifier corresponding to the second identifier simultaneously, thereby explicitly indicating the correspondence between the second identifier and the first identifier.

In some embodiments, the first terminal equipment may add the second identifier to the header of the adaptation layer after receiving the second identifier allocated by the network device, and reference to may be to existing techniques for details. A procedure of information exchange between the first terminal equipment, the second terminal equipment and the network device shall be described in the embodiment of the second aspect.

(II) The First Terminal Equipment is in an RRC Idle or Inactive Mode

In some embodiments, when the first terminal equipment is in an RRC idle or inactive mode, it may transmit the first identification information and receive the second identification information in the method in (I) after entering into the RRC connected mode. For example, the method may further include: the first terminal equipment receives a first RRC message for the second terminal equipment transmitted by the second terminal equipment, enters into the RRC connected mode, and transmits the first identification information and receives the second identification information, etc. by the first terminal equipment in the method in (I) after entering into the RRC connected mode. Reference may be made to (I) for implementation of the first RRC message, which shall not be repeated herein any further.

In some embodiments, when the first terminal equipment is in the RRC idle or inactive mode, it may execute an RRC connection establishment process or RRC resume process, and transmit the first identification information during the RRC connection establishment or RRC resume process, which are as described below.

For example, in 602, the first identification information may be carried by a second RRC message for the first terminal equipment. For example, the second RRC message for the first terminal equipment refers to that the RRC message is generated by the RRC of the first terminal equipment (for uplink), or is received or parsed or processed by the RRC of the first terminal equipment (for downlink). The second RRC message may be an RRC message transmitted by the first terminal equipment to the network device during its own procedure of RRC connection establishment or procedure of RRC resume, including an RRC setup request, or an RRC setup complete message, or an RRC resume request, or an RRC resume complete message, etc.

For example, in 603, the second identification information may be carried by a third RRC message for the first terminal equipment. The third RRC message for the first terminal equipment refers to being received or processed by the RRC of the first terminal equipment, for example, the third RRC message includes an RRC setup message, or an RRC resume message, or an RRC reconfiguration message, etc.

In some embodiments, the third RRC message may include second identification information. An order of arrangement of the second identifiers in the second identification information is identical to the order of presence of the first identifier related to the at least one second terminal equipment in the first identification information, the order of presence of the first identifier includes an order of presence in the same second RRC message. For example, when there are more than one second terminal equipment connected to the first terminal equipment, the first identification information includes first identifiers related to the more than one second terminal equipment, and an order of presence of the second identifiers corresponds to the order of presence of the first identifiers one to one. Thus, the correspondence between the second identifier and the first identifier is indicated implicitly.

In some embodiments, the third RRC message may also indicate simultaneously the second identifier and the first identifier corresponding to the second identifier, thereby explicitly indicating the correspondence between the second identifier and the first identifier.

For example, when the second RRC message is RRC setup/resume request, the third RRC message may be RRC setup/resume or RRC reconfiguration, or when the second RRC message is RRC setup/resume complete, the third RRC message may be RRC reconfiguration, which shall not be enumerated herein any further.

In some embodiments, the first terminal equipment may add the second identifier to the header of the adaptation layer after receiving the second identifier allocated by the network device, and reference to may be to existing techniques for details. A procedure of information exchange between the first terminal equipment, the second terminal equipment and the network device shall be described in the embodiment of the second aspect.

It can be seen from the above embodiment that the identifier of the second terminal equipment may be configured by the serving network device of the first terminal equipment, so that the first terminal equipment may use the identifier in forwarding the data of the second terminal equipment (such as the RRC message, and the user-plane data, etc.), which is conducive to correctly recognizing the RRC message and user-plane data of the second terminal equipment by the network device.

Embodiment of the Second Aspect

The embodiment of this disclosure provides an information reception method, applicable to a side of a network device.

Figure 7:
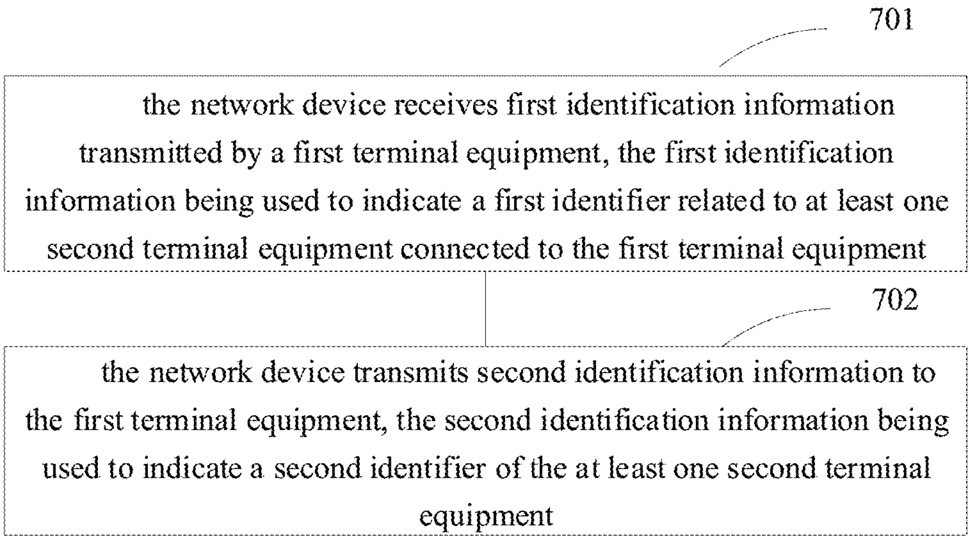
FIG. 7 is a schematic diagram of the information reception method of an embodiment of this disclosure.

FIG. 7 is a schematic diagram of the information reception method. As shown in FIG. 7, the method includes:

701: the network device receives first identification information transmitted by a first terminal equipment, the first identification information being used to indicate a first identifier related to at least one second terminal equipment connected to the first terminal equipment.

In some embodiments, implementation of 701 corresponds to 602 in the embodiment of the first aspect, and reference may be made to the embodiment of the first aspect for the first identifier, a mode of carrying the first identification information and a format thereof, which shall not be repeated herein any further.

In some embodiments, the method may further include:

702: the network device transmits second identification information to the first terminal equipment, the second identification information being used to indicate a second identifier of the at least one second terminal equipment.

In some embodiments, implementation of 702 corresponds to 603 in the embodiment of the first aspect, and reference may be made to the embodiment of the first aspect for the second identifier, a mode of carrying the second identification information and a format thereof, which shall not be repeated herein any further.

In some embodiments, the method may further include (not shown): the network device uses or stores a correspondence between the first identifier and the second identifier by, or uses or stores a correspondence between the first identifier, the second identifier and an allocated C-RNTI by the network device.

FIGS. 8-11 are schematic diagrams of uplink and downlink transmission methods in a scenario of terminal equipment-network device relay of the embodiment of this disclosure, which shall be respectively described below with reference to FIGS. 8-11.

Figure 8:
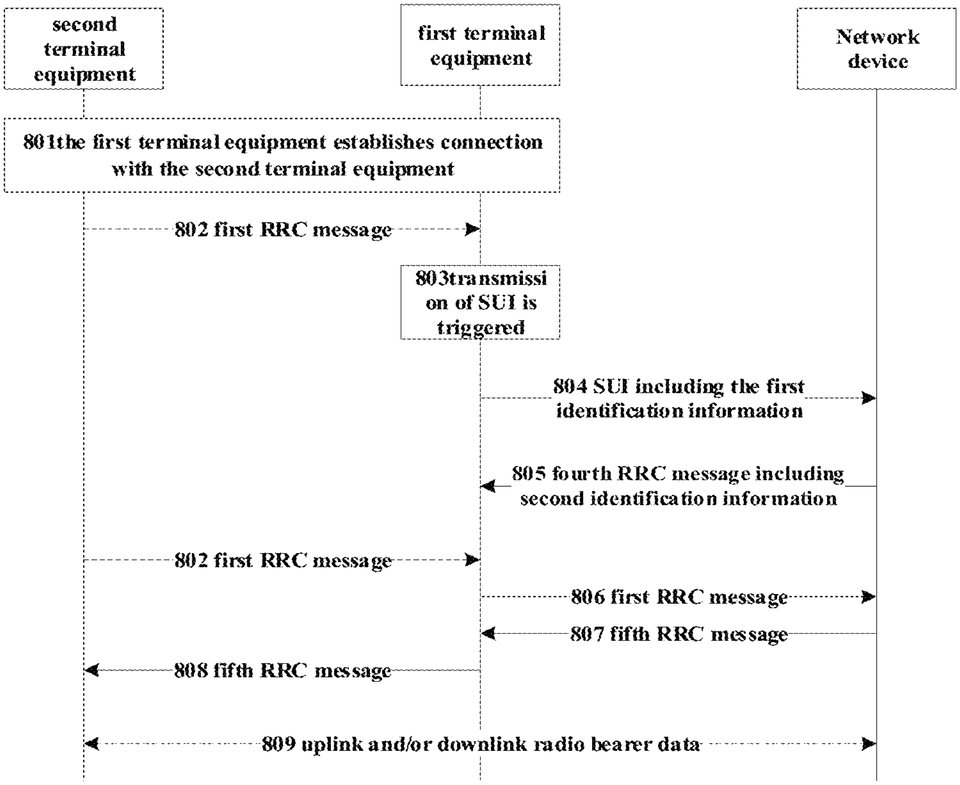
FIGS. 8-11 are schematic diagrams of uplink and downlink transmission methods in a scenario of terminal equipment-network device relay of an embodiment of this disclosure.

FIG. 8 is a schematic diagram of a method when the first terminal equipment is in an RRC connected mode. As shown in FIG. 8, the method includes:

801: the first terminal equipment establishes connection with the second terminal equipment;

802: the second terminal equipment transmits a first RRC message to the first terminal equipment (such as by using default layer-2 configuration on a PC5 interface), so as to establish connection with the network device via the first terminal equipment;

803: transmission of SUI is triggered when a first triggering condition is satisfied;

804: the first terminal equipment transmits the SUI to the network device, the SUI carrying the first identification information;

805: the network device transmits a fourth RRC message to the first terminal equipment, the fourth RRC message carrying the second identification information;

806: the first terminal equipment forwards the first RRC message to the network device, wherein the second identifier is included in a header of an adaptation layer;

807: the network device replies to the first terminal equipment with an RRC setup message (a fifth RRC message) for the second terminal equipment upon receiving a connection establishment request from the second terminal equipment, the message including the second identifier in the header of the adaptation layer, and optionally including a C-RNTI of the second terminal equipment;

808: the first terminal equipment forwards the RRC setup message to the second terminal equipment (such as by using the default layer-2 configuration on the PC5 interface); and

809: the second terminal equipment and the network device transceive uplink and/or downlink radio bearer data via the first terminal equipment, wherein at the PC5 interface, transmission and/or reception of the uplink and/or downlink radio bearer data may be performed by using a source layer 2 or a destination layer 2 identifier, in a header file of the adaptation layer of the PC5 interface, the carried identifier may be included, and at a Uu interface, the uplink and/or downlink radio bearer data include the second identifier and a Uu radio bearer identifier in the header of the adaptation layer of the Uu interface, so that the network device recognizes the second terminal equipment, that is, determining a second terminal equipment to which the uplink and downlink transmission corresponds.

Figure 9:
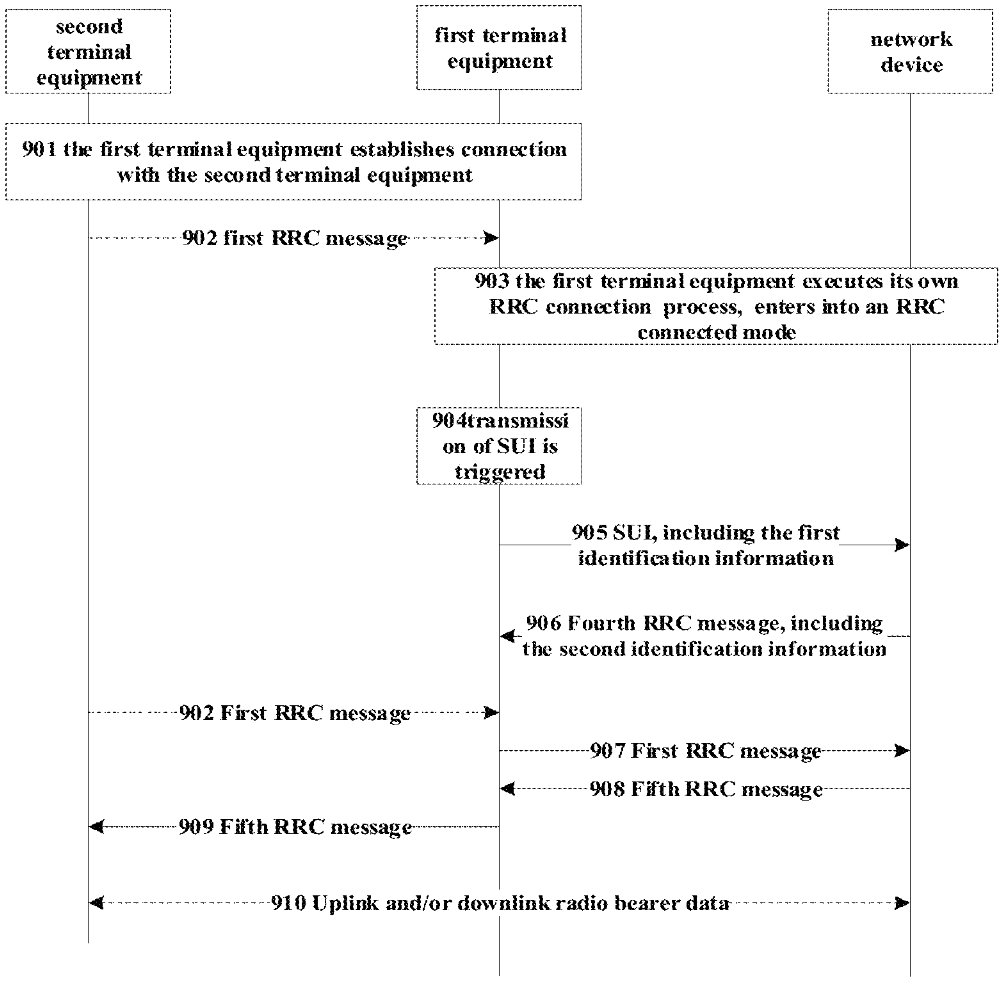

FIG. 9 is a schematic diagram of a method when the first terminal equipment is in an RRC idle or inactive mode. As shown in FIG. 9, the method includes:

901: the first terminal equipment establishes connection with the second terminal equipment;

902: the second terminal equipment transmits a first RRC message to the first terminal equipment (such as by using default layer-2 configuration on a PC5 interface), so as to establish connection with the network device via the first terminal equipment;

903: the first terminal equipment executes its own RRC connection establishment process or RRC resume process, and enters into an RRC connected mode, wherein reference may be made to existing techniques for details, which shall not be repeated herein any further;

904: transmission of SUI is triggered when a first triggering condition is satisfied;

905: the first terminal equipment transmits the SUI to the network device, the SUI carrying the first identification information;

906: the network device transmits a fourth RRC message to the first terminal equipment, the fourth RRC message carrying the second identification information;

907: the first terminal equipment forwards the first RRC message to the network device, wherein the second identifier is included in a header of an adaptation layer;

908: the network device replies to the first terminal equipment with an RRC setup message (a fifth RRC message) for the second terminal equipment upon receiving a connection establishment request from the second terminal equipment, the message including the second identifier in the header of the adaptation layer, and optionally including a C-RNTI of the second terminal equipment;

909: the first terminal equipment forwards the RRC setup message to the second terminal equipment (such as by using the default layer-2 configuration on the PC5 interface); and

910: the second terminal equipment and the network device transceive uplink and/or downlink radio bearer data via the first terminal equipment, wherein at the PC5 interface, transmission and/or reception of the uplink and/or downlink radio bearer data may be performed by using a source layer 2 or a destination layer 2 identifier, in a header file of the adaptation layer of the PC5 interface, the carried identifier may be included, and at a Uu interface, the uplink and/or downlink radio bearer data include the second identifier and a Uu radio bearer identifier of the second terminal equipment in the header of the adaptation layer of the Uu interface, so that the network device recognizes the second terminal equipment, that is, determining a second terminal equipment to which the uplink and downlink transmission corresponds.

Figure 10:
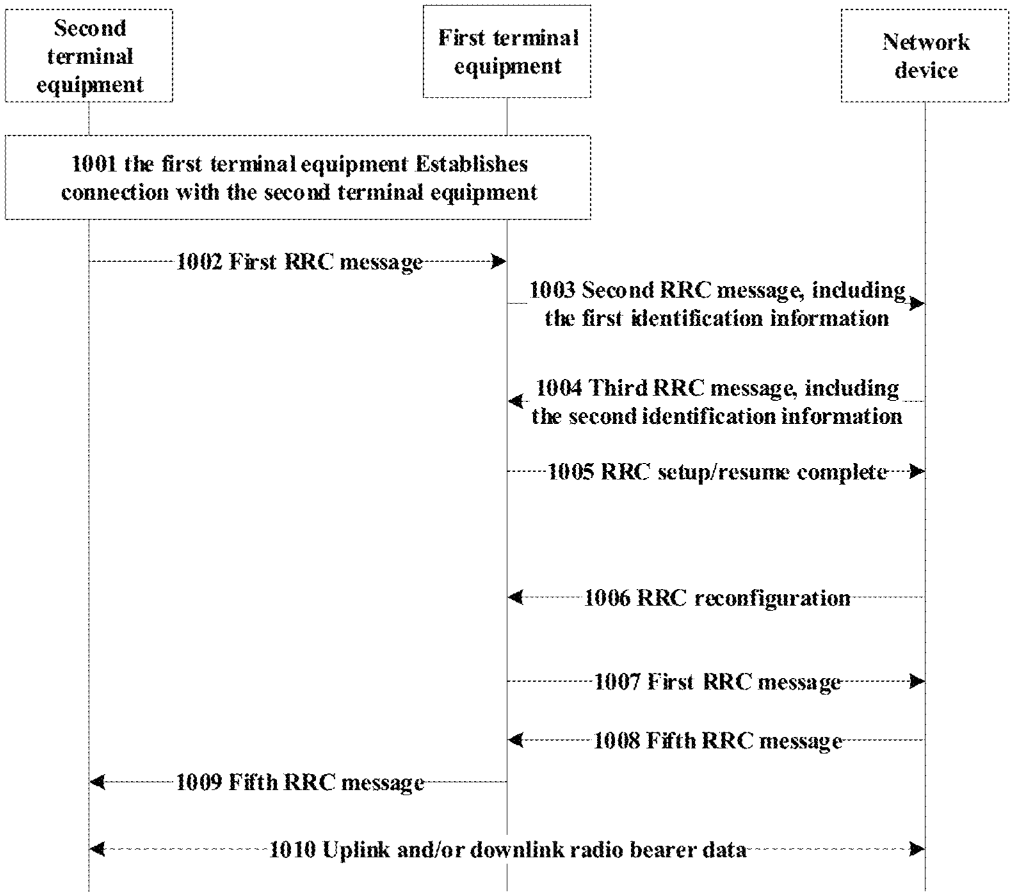

FIG. 10 is a schematic diagram of a method when the first terminal equipment is in an RRC idle or inactive mode. As shown in FIG. 10, the method includes:

1001: the first terminal equipment establishes connection with the second terminal equipment;

1002: the second terminal equipment transmits a first RRC message to the first terminal equipment (such as by using default layer-2 configuration on a PC5 interface), so as to establish connection with the network device via the first terminal equipment;

1003: the first terminal equipment executes its own RRC connection establishment process or RRC resume process, and transmits a second RRC message to the network device, wherein the second RRC message carries the first identification information, and the second RRC message is an RRC setup request message or an RRC resume request message;

1004: the network device transmits a third RRC message to the first terminal equipment after receiving the second RRC message, the third RRC message being an RRC setup message or an RRC resume message;

1005: the first terminal equipment transmits an RRC setup complete message or an RRC resume complete message for its own to the network device, so as to complete an RRC connection process or RRC resume procedure of its own;

1006: the network device transmits an RRC reconfiguration message to the first terminal equipment;

1007: the first terminal equipment forwards the first RRC message to the network device, wherein the second identifier is included in a header of an adaptation layer;

1008: the network device replies to the first terminal equipment with an RRC setup message (a fifth RRC message) for the second terminal equipment upon receiving a connection establishment request from the second terminal equipment, the message including the second identifier in the header of the adaptation layer, and optionally including a C-RNTI of the second terminal equipment;

1009: the first terminal equipment forwards the RRC setup message for the second terminal equipment to the second terminal equipment (such as by using the default layer-2 configuration on the PC5 interface); and

1010: the second terminal equipment and the network device transceive uplink and/or downlink radio bearer data via the first terminal equipment, wherein at the PC5 interface, transmission and/or reception of the uplink and/or downlink radio bearer data may be performed by using a source layer 2 or a destination layer 2 identifier, in a header file of the adaptation layer of the PC5 interface, the carried identifier may be included, and at a Uu interface, the uplink and/or downlink radio bearer data include the second identifier and a Uu radio bearer identifier of the second terminal equipment in the header of the adaptation layer of the Uu interface, so that the network device recognizes the second terminal equipment, that is, determining a second terminal equipment to which the uplink and downlink transmission corresponds.

Figure 11:
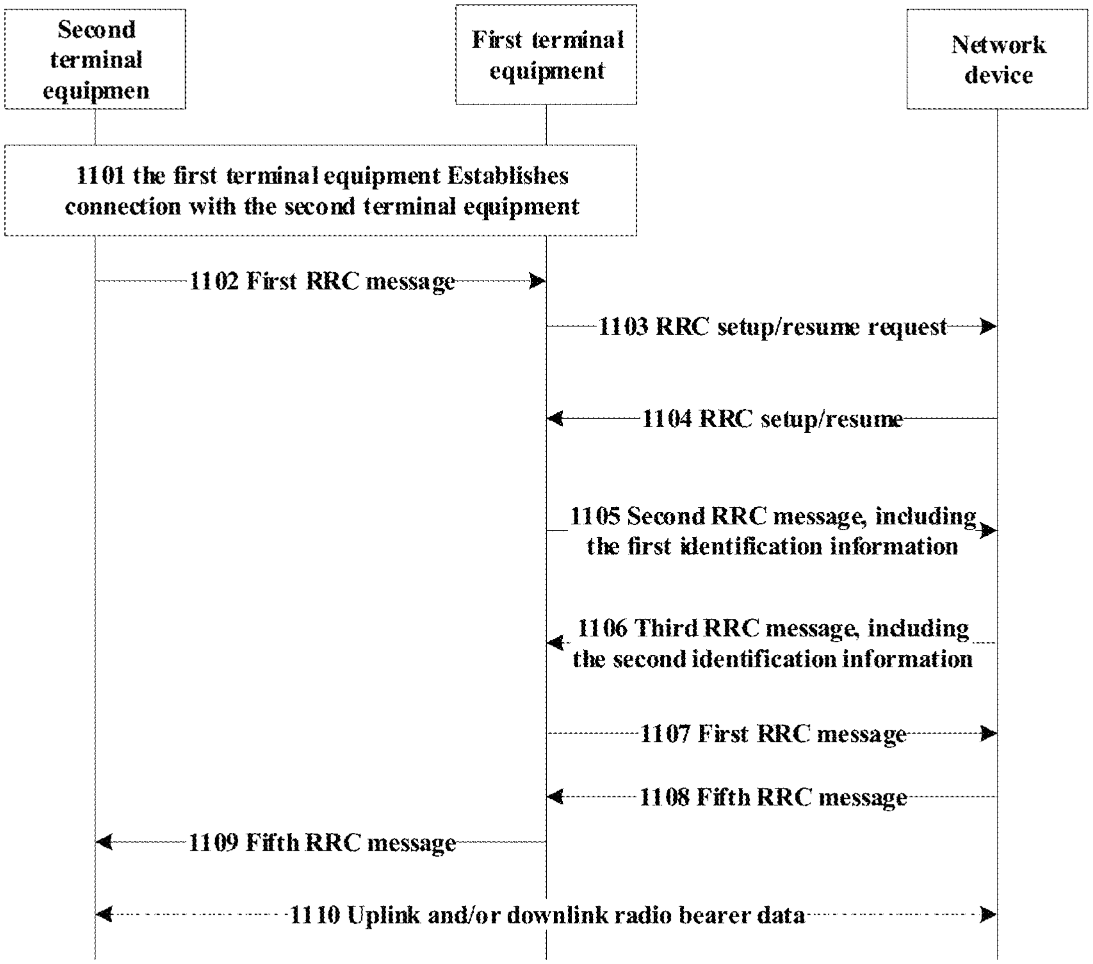

FIG. 11 is a schematic diagram of a method when the first terminal equipment is in an RRC idle or inactive mode. As shown in FIG. 9, the method includes:

1101: the first terminal equipment establishes connection with the second terminal equipment;

1102: the second terminal equipment transmits a first RRC message to the first terminal equipment (such as by using default layer-2 configuration on a PC5 interface), so as to establish connection with the network device via the first terminal equipment;

1103: the first terminal equipment executes its own RRC connection establishment process or RRC resume process, and transmits an RRC setup/resume request message for itself to the network device;

1104: the network device transmits an RRC setup/resume message for the first terminal equipment to the first terminal equipment after receiving the RRC setup/resume request message;

1105: the first terminal equipment transmits a second RRC message to the network device, the second RRC message carrying the first identification information, the second RRC message being an RRC setup/resume complete message;

1106: the network device transmits a third RRC message to the first terminal equipment, the third RRC message carrying the second identification information, and the third RRC message being an RRC reconfiguration message;

1107: the first terminal equipment forwards the first RRC message to the network device, wherein the second identifier is included in a header of an adaptation layer;

1108: the network device replies to the first terminal equipment with an RRC setup message (a fifth RRC message) for the second terminal equipment upon receiving a connection establishment request from the second terminal equipment, the message including the second identifier in the header of the adaptation layer, and optionally including a C-RNTI of the second terminal equipment;

1109: the first terminal equipment forwards the RRC setup message for the second terminal equipment to the second terminal equipment (such as forwarding the fifth RRC message by using the default layer-2 configuration on the PC5 interface); and

1110: the second terminal equipment and the network device transceive uplink and/or downlink radio bearer data via the first terminal equipment, wherein at the PC5 interface, transmission and/or reception of the uplink and/or downlink radio bearer data may be performed by using a source layer 2 or a destination layer 2 identifier, in a header file of the adaptation layer of the PC5 interface, the carried identifier may be included, and at a Uu interface, the uplink and/or downlink radio bearer data include the second identifier and a Uu radio bearer identifier of the second terminal equipment in the header of the adaptation layer of the Uu interface, so that the network device recognizes the second terminal equipment, that is, determining a second terminal equipment to which the uplink and downlink transmission corresponds.

In the above embodiments, reference may be made to the first embodiment for implementations of 801-805, 901-905, 1001-1005 and 1101-1105. In addition, operation 802 may be performed before 803, or may be performed after 803, or may be performed after 804 or 805, and the embodiment of this disclosure is not limited thereto.

It can be seen from the above embodiment that the identifier of the second terminal equipment may be configured by the serving network device of the first terminal equipment, so that the first terminal equipment may use the identifier in forwarding the data of the second terminal equipment (such as the RRC message, and the user-plane data, etc.), which is conducive to correctly recognizing the RRC message and user-plane data of the second terminal equipment by the network device.

How to allocate the identifiers related to the remote terminal equipment in the initial access process is described in the embodiments of the first and second aspects. How to allocate the identifiers related to the remote terminal equipment in a switching process shall be described below with reference to the embodiments of the third to fifth aspects. During the switching process, the second identifier may be configured or reconfigured by the network device.

Embodiment of the Third Aspect

The embodiment of this disclosure provides an information transmission method, applicable to a side of a network device (hereinafter referred to as a target network device).

Figure 12:
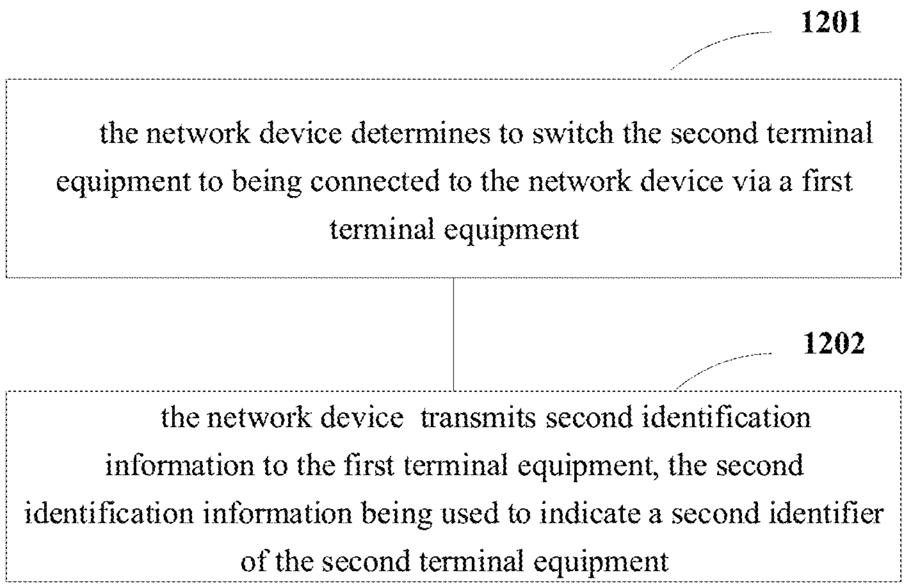
FIG. 12 is a schematic diagram of the information transmission method of an embodiment of this disclosure.

FIG. 12 is a schematic diagram of the information transmission method. As shown in FIG. 12, the method includes:

1201: the network device determines to switch the second terminal equipment to being connected to the network device via a first terminal equipment; and

1202: the network device transmits second identification information to the first terminal equipment, the second identification information being used to indicate a second identifier of the second terminal equipment.

In some embodiments, in 1201, the switching of the second terminal equipment includes first switching or second switching, wherein the first switching refers to that the second terminal equipment is switched to being connected to a target network device via the first terminal equipment (indirect link) from being connected to a source network device via a Uu interface (direct link), the second switching refers to that the second terminal equipment is switched to being connected to the target network device via a target first terminal equipment from being connected to the source network device via a source first terminal equipment (from an indirect link to an indirect link). The source network device and the target network device may be identical or different, and the embodiment of this disclosure is not limited thereto. Determining by the network device whether/how the second terminal equipment is switched may be determining according to a measurement report reported by the second terminal equipment, and reference may be made to existing techniques for details, which shall not be repeated herein any further.

In some embodiments, as switching is needed, in 1202, the network device may allocate a new second identifier for the second terminal equipment and notify the first terminal equipment (the target first terminal equipment) of the allocated new second identifier, and reference may be made to the embodiment of the first aspect for a meaning of the second identifier. For example, the second identification information may be carried by a first RRC reconfiguration message, and at this moment, the first terminal equipment and the second terminal equipment may have established connection or have not yet established connection, which shall be described below respectively.

(I) Connection Between the First Terminal Equipment and the Second Terminal Equipment has not been Established Before Switching In this embodiment, the network device may transmit the second identification information to the first terminal equipment before switching of the second terminal equipment is completed. As connection has not been established between the first terminal equipment and the second terminal equipment during the switching, the first terminal equipment does not learn the first identifier related to the second terminal equipment, and therefore does not learn a second terminal equipment to which the allocated second identifier corresponds. In this embodiment, the method may further include (not shown):

- the network device transmits the second identification information to the second terminal equipment.

In this embodiment, the network device may carry the second identification information transmitted to the second terminal equipment via the second RRC reconfiguration message, so that during or after the procedure of establishing connection by the first terminal equipment and the second terminal equipment, the first terminal equipment and the network device may determine a correspondence between the first identifier and the second identifier, that is, the method may further include (not shown):

- the network device receives the first identification information transmitted by the first terminal equipment and the corresponding second identification information after establishing connection by the first terminal equipment and the second terminal equipment, wherein the first identification information is used to indicate the first identifier related to the second terminal equipment, and reference may be made to the embodiment of the first aspect for a meaning of the first identifier.

In this embodiment, after establishing connection by the first terminal equipment and the second terminal equipment, the first terminal equipment may determine the correspondence between the second identifier and the first identifier (which shall be described in detail in the embodiment the fourth aspect). The first terminal equipment may transmit the first identification information and the corresponding second identification information to the network device, and the method may further include: the network device uses or stores the correspondence between the first identifier and the second identifier.

In some embodiments, the first identification information and the corresponding second identification information may be carried by an SUI message. For example, the SUI message may be a newly-added information element sl-RemoteUEList-r16 in the SUI, the newly added information element, for example, including a first identifier and a second identifier, or the SUI message may be included in a sidelink failure information element sl-FailureList-r16, or may be included in a sidelink transmission resource request information element SL-TxResourceReq-r16.

For example, when the SUI message is included in the sidelink failure information element sl-FailureList-r16, if the first terminal equipment detects a failure in the sidelink radio link between the first terminal equipment and the second terminal equipment and transmits the SUI, the network device may identify a second terminal equipment where a sidelink radio link failure (SL RLF) occurs between the second terminal equipment and the first terminal equipment, and stop transmitting data to the second terminal equipment via the first terminal equipment, thereby saving overhead.

(II) The Connection Between the First Terminal Equipment and the Second Terminal Equipment is Established Before Switching In this embodiment, as connection has already been established between the first terminal equipment and the second terminal equipment during switching, that is, the first terminal equipment has already learnt the first identifier related to the second terminal equipment, hence, in this embodiment, the method may further include (not shown):

- after the first terminal equipment establishes connection with the second terminal equipment, the network device receives, the first identification information transmitted by the second terminal equipment, the first identification information being used to indicate the first identifier related to the second terminal equipment.

In this embodiment, the second terminal equipment may carry the first identification information via a measurement report message, that is, before switching, the network device has already learnt the first identifier related to the second terminal equipment, hence, in 1202, the network device may simultaneously notify the first terminal equipment of the second identification information and the first identifier to which the second identifier corresponds. That is, the first RRC reconfiguration message not only carries the second identification information, but also indicates the first identifier corresponding to the second identifier. That is, the method may further include (not shown): the network device uses or stores the correspondence between the first identifier and the second identifier. Reference may be made to the embodiment of the second aspect for specific implementation, which shall not be described here in any further.

It can be seen from the above embodiment that the identifier of the second terminal equipment may be configured by the serving network device of the first terminal equipment, so that the first terminal equipment may use the identifier in forwarding the data of the second terminal equipment (such as the RRC message, and the user-plane data, etc.), which is conducive to correctly recognizing the RRC message and user-plane data of the second terminal equipment by the network device.

Embodiment of the Fourth Aspect

The embodiment of this disclosure provides an information reception method, applicable to a side of a first terminal equipment (hereinafter referred to as a target first terminal equipment).

Figure 13:
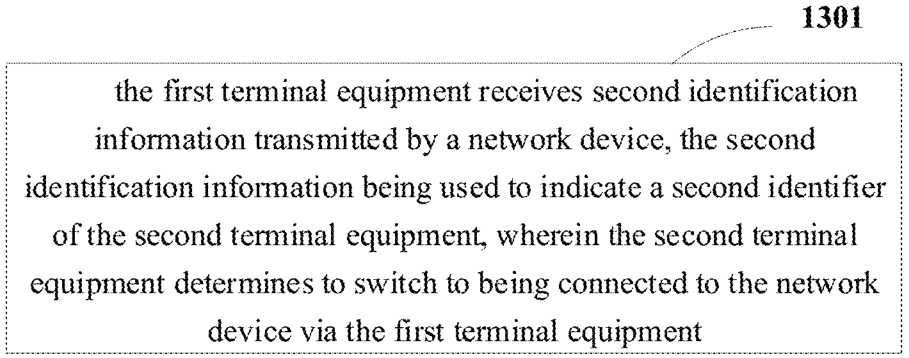
FIG. 13 is a schematic diagram of the information reception method of an embodiment of this disclosure.

FIG. 13 is a schematic diagram of the information reception method. As shown in FIG. 13, the method includes:

1301: the first terminal equipment receives second identification information transmitted by a network device, the second identification information being used to indicate a second identifier of the second terminal equipment, wherein the second terminal equipment determines to switch to being connected to the network device via the first terminal equipment.

In some embodiments, implementation of 1301 corresponds to that of 1202, which shall not be described herein any further.

(I) Connection Between the First Terminal Equipment and the Second Terminal Equipment has not been Established Before Switching In some embodiments, in 1301, the second identification information may be carried by a first RRC reconfiguration message.

In some embodiments, the method may further include:

the first terminal equipment receives the second identification information transmitted by the second terminal equipment.

For example, the second identification information transmitted by the second terminal equipment is carried by a sidelink signaling message or a sidelink RRC message between the first terminal equipment and the second terminal equipment, the sidelink signaling (PC5-S) message or the sidelink RRC (PC5-RRC) message being further used to indicate the first identifier. For example, the first identifier may be explicitly included in the above message or may be implicitly indicated by a lower layer (such as an MAC layer and/or a physical layer).

For example, the sidelink signaling message may be a discovery message or a direct communication request message or a direct communication accept message, and the sidelink RRC message may be an RRC reconfiguration sidelink (RRCReconfigurationSidelink) message or an RRC reconfiguration complete sidelink (RRCReconfiguration-CompleteSidelink) message. The above messages may be transmitted during or after a process in which the second terminal equipment and the first terminal equipment perform relay discovery, or relay selection, or relay reselection, or PC5 unicast link establishment. That is, the sidelink signaling message or sidelink RRC message between the first terminal equipment and the second terminal equipment indicates the first identifier and the second identifier, after the first terminal equipment and the second terminal equipment establish connection, the first terminal equipment may determine the correspondence between the second identifier and the first identifier.

In some embodiments, after the first terminal equipment and the second terminal equipment establish connection, the method may further include:

the first terminal equipment transmits first identification information and corresponding second identification information to the network device, the first identification information being used to indicate the first identifier related to the second terminal equipment. Reference may be made to the embodiment of the first aspect for a meaning of the first identifier.

That is, after determining the correspondence between the second identifier and the first identifier, the first terminal equipment may transmit first identification information and corresponding second identification information to the network device. And the method may further include (not shown): the first terminal equipment uses or stores the correspondence between the first identifier and the second identifier. Reference may be made to the embodiment of the second aspect for specific implementation, which shall not be described herein any further.

In some embodiments, the first identification information and the corresponding second identification information transmitted by the first terminal equipment may be carried by an SUI message, and reference may be made to the embodiment of the third aspect for details, which shall not be described herein any further.

(II) The Connection Between the First Terminal Equipment and the Second Terminal Equipment is Established Before Switching In this embodiment, as connection has already been established between the first terminal equipment and the second terminal equipment during switching, that is, the first terminal equipment has already learnt the first identifier related to the second terminal equipment (reference may be made to the embodiment of the first aspect for details), hence, in this embodiment, in 1301, the first RRC reconfiguration message may simultaneously indicate the second identifier and the first identifier corresponding thereto, and the first terminal equipment may determine the correspondence between the second identifier and the first identifier after receiving the first RRC reconfiguration message. The method may further include (not shown): the first terminal equipment uses or stores the correspondence between the first identifier and the second identifier. Reference may be made to the embodiment of the second aspect for specific implementation, which shall not be described herein any further.

The identifier of the second terminal equipment may be configured by the serving network device of the first terminal equipment, so that the first terminal equipment may use the identifier in forwarding the data of the second terminal equipment (such as the RRC message, and the user-plane data), which is conducive to correctly recognizing the RRC message and user-plane data of the second terminal equipment by the network device.

Embodiment of the Fifth Aspect

The embodiment of this disclosure provides an information transceiving method, applicable to a side of a second terminal equipment.

Figure 14:
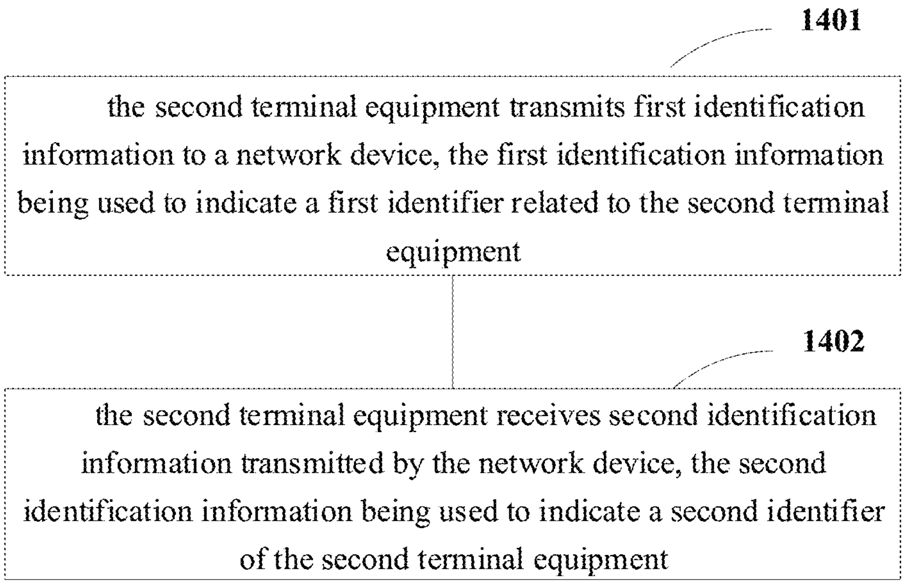
FIG. 14 is a schematic diagram of an information reception and transmission method of an embodiment of this disclosure.

FIG. 14 is a schematic diagram of the information transceiving method. As shown in FIG. 14, the method includes:

1401: the second terminal equipment transmits first identification information to a network device, the first identification information being used to indicate a first identifier related to the second terminal equipment; and/or,

1402: the second terminal equipment receives second identification information transmitted by the network device, the second identification information being used to indicate a second identifier of the second terminal equipment.

In some embodiments, reference may be made to the embodiments of the third or fourth aspect implementations of 1401-1402, which shall not be repeated herein any further.

Figure 15:
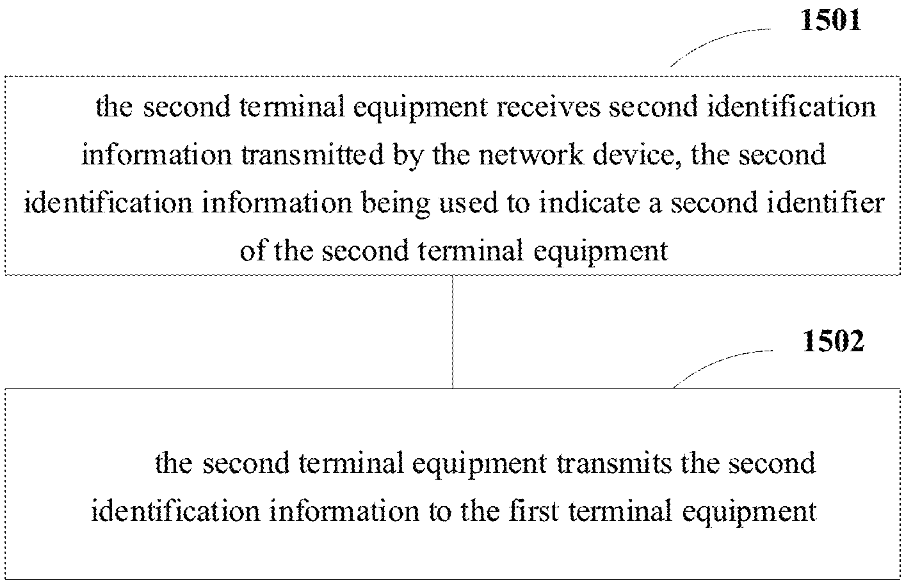
FIG. 15 is a schematic diagram of an information reception and transmission method of an embodiment of this disclosure.

(I) Connection Between the First Terminal Equipment and the Second Terminal Equipment has not been Established Before Switching FIG. 15 is a schematic diagram of the information transceiving method. As shown in FIG. 15, the method includes:

1501: the second terminal equipment receives second identification information transmitted by the network device, the second identification information being used to indicate a second identifier of the second terminal equipment; and

1502: the second terminal equipment transmits the second identification information to the first terminal equipment.

In some embodiments, in 1501, the second identification information may be carried by a second RRC reconfiguration message, such as an RRC reconfiguration message containing information on switching to a target first terminal equipment (such as a switching command), and reference may be made to the embodiment of the third aspect for implementation thereof, which shall not be repeated herein any further.

In some embodiments, in 1502, the second identification information may be carried by a sidelink signaling message or sidelink RRC message between the first terminal equipment and the second terminal equipment. The sidelink signaling message or sidelink RRC message is also used to indicate the first identifier, and reference may be made to the embodiment of the fourth aspect for implementation thereof, which shall not be repeated herein any further.

Figure 16:
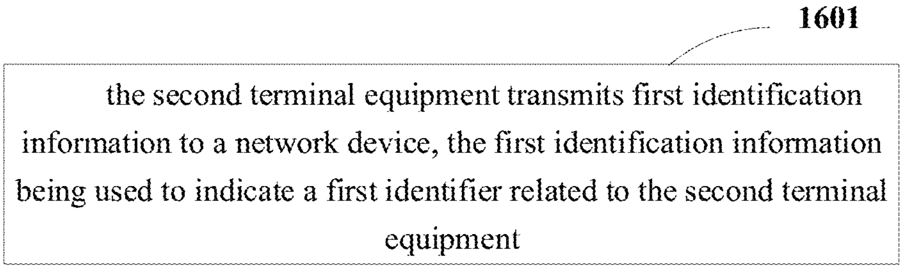
FIG. 16 is a schematic diagram of the information transmission method of an embodiment of this disclosure.

(II) The Connection Between the First Terminal Equipment and the Second Terminal Equipment is Established Before Switching FIG. 16 is a schematic diagram of the information transceiving method. As shown in FIG. 16, the method includes:

1601: the second terminal equipment transmits first identification information to a network device, the first identification information being used to indicate a first identifier related to the second terminal equipment.

In some embodiments, in 1601, the first identification information may be carried by a measurement report message, and reference may be made to the embodiment of the third aspect for details.

A switching method shall be described below with reference to FIGS. 17-18 by taking switching from a direct link to an indirect link as an example.

Figure 17:
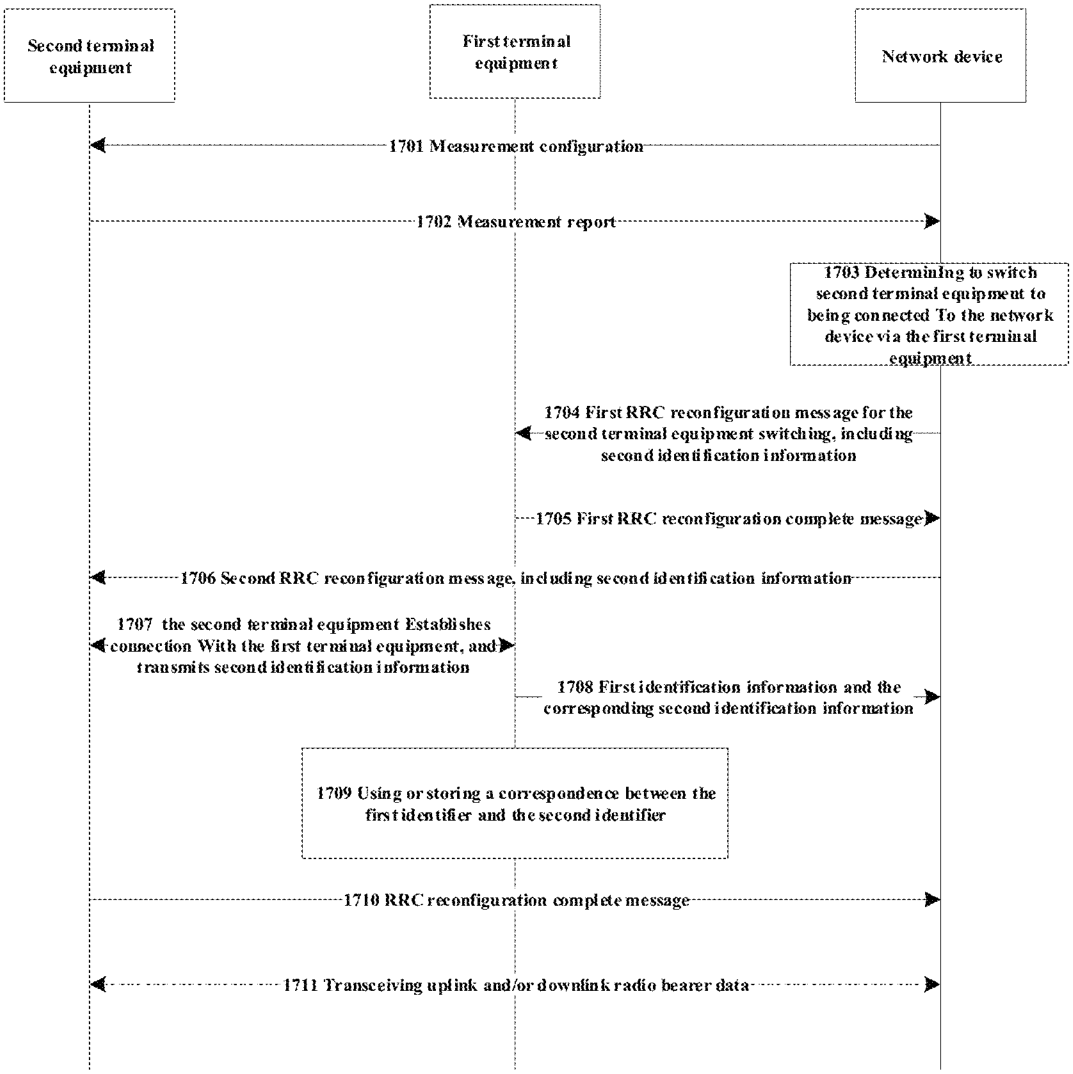
FIGS. 17-18 are schematic diagrams of a switching method in the scenario of terminal equipment-network device relay of the embodiment of this disclosure.

FIG. 17 is a schematic diagram of a switching method in a case where the connection between the first terminal equipment and the second terminal equipment has not been established before switching. As shown in FIG. 17, the method includes:

1701: a (target) network device transmits measurement configuration to the second terminal equipment;

1702: the second terminal equipment performs measurement according to the measurement configuration and reports the measurement report, the measurement report including an identifier of at least one candidate first terminal equipment (relay UE ID), a serving cell of the first terminal equipment, and a sidelink measurement result;

1703: the network device determines according to the measurement report to switch the second terminal equipment to being connected to the network device via the first terminal equipment;

1704: the network device transmits a first RRC reconfiguration message for the second terminal equipment switching to the first terminal equipment, the message including second identification information, Uu and PC5 RLC configuration for relay and bearer mapping configuration, and completes RLC configuration and bearer mapping configuration with a corresponding PC5 interface and Uu interface by the first terminal equipment according to the first RRC reconfiguration message;

1705: the first terminal equipment transmits an RRC reconfiguration complete message to the network device (corresponding to 1704), wherein reference may be made to existing techniques for details;

1706: the network device transmits a second RRC reconfiguration message for the second terminal equipment to the second terminal equipment, such as a switching command of switching to being connected to the network device via the first terminal equipment, the message including the second identification information, an identifier of the first terminal equipment (relay UE ID), PC5 RLC configuration of relay services, and related end-to-end radio bearer configuration, and the second terminal equipment determines according the second RRC reconfiguration message to switch to being connected to the network device via which the first terminal equipment;

1707: the second terminal equipment establishes connection and the first terminal equipment, wherein reference may be made to the embodiment of the first aspect for specific implementation thereof; for example, during or after the procedure of establishing connection, the second identification information is carried by a sidelink signaling message or sidelink RRC message between the first terminal equipment and the second terminal equipment, the sidelink signaling (PC5-S) message or sidelink RRC (PC5-RRC) message being also used to indicate the first identifier;

1708 (optional): the first terminal equipment transmits the first identification information and the corresponding second identification information to the network device; for example, SUI is used to carry the first identification information and the corresponding second identification information, which shall not be repeated herein any further; in a case where the first identification information and corresponding second identification information transmitted by the first terminal equipment to the network device are included in a sidelink failure information element sl-FailureList-r16 of the SUI message, this step is executed when a sidelink radio link failure is detected;

1709: the first terminal equipment uses or stores a correspondence between the first identifier and the second identifier;

1710: the second terminal equipment transmits an RRC reconfiguration complete message to the network device via the first terminal equipment (corresponding to 1706); and

1711 (optional): the second terminal equipment completes switching, the second terminal equipment and the network device transceive uplink and/or downlink radio bearer data via the first terminal equipment, wherein at the PC5 interface, transmission and/or reception of the uplink and/or downlink radio bearer data may be performed by using a source layer 2 or a destination layer 2 identifier, in a header file of the adaptation layer of the PC5 interface, the carried identifier may be included, and at a Uu interface, the uplink and/or downlink radio bearer data include the second identifier and a Uu radio bearer identifier of the second terminal equipment in the header of the adaptation layer of the Uu interface, so that the network device recognizes the second terminal equipment, that is, determines a second terminal equipment to which the uplink and downlink transmission corresponds.

Figure 18:
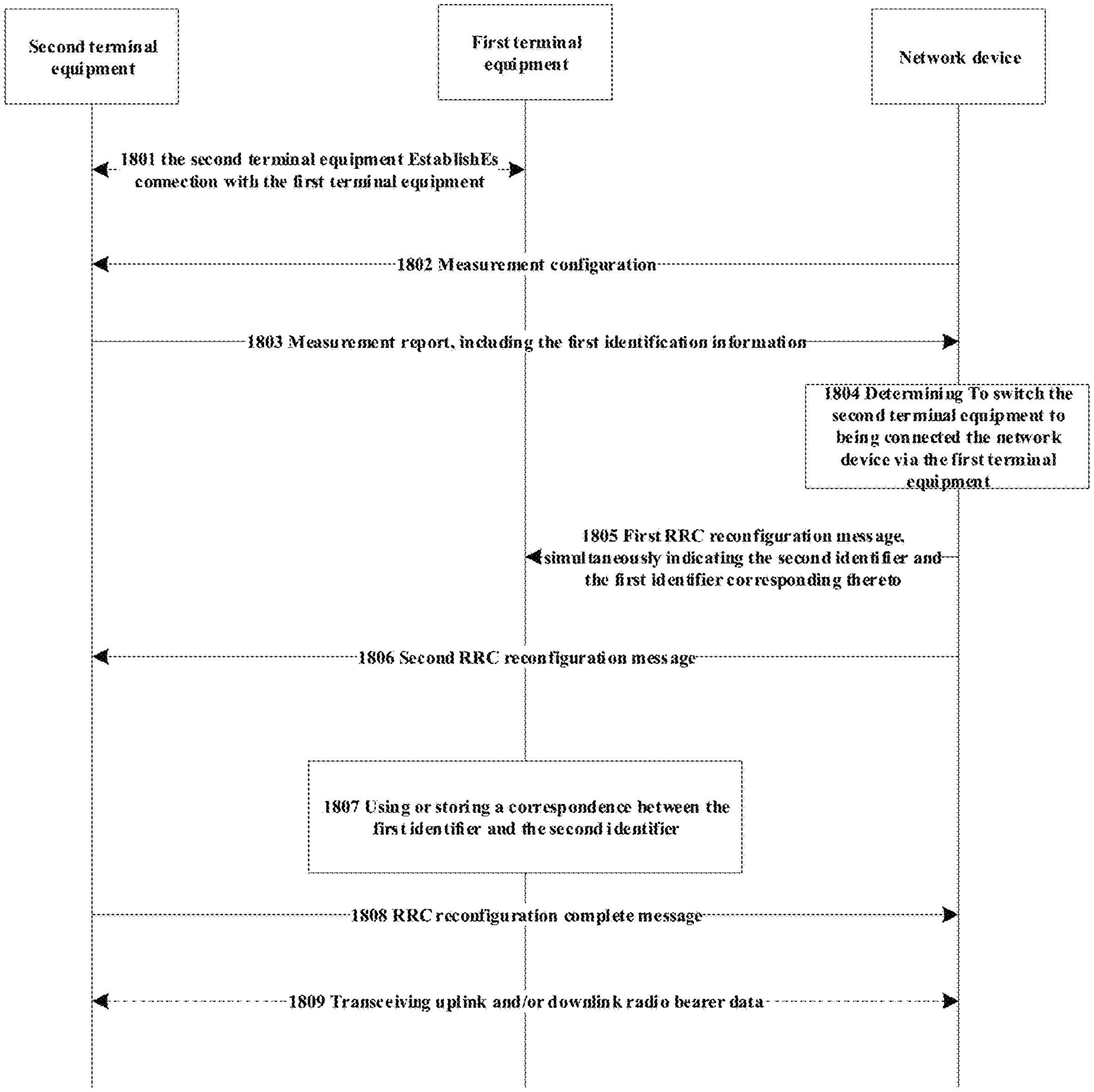

FIG. 18 is a schematic diagram of a switching method in a case where the connection between the first terminal equipment and the second terminal equipment has been established before switching. As shown in FIG. 18, the method includes:

1801: the second terminal equipment establishes connection with the first terminal equipment;

1802: a (target) network device transmits measurement configuration to the second terminal equipment;

1803: the second terminal equipment performs measurement according to the measurement configuration and reports the measurement report, the measurement report including an identifier of at least one candidate first terminal equipment (relay UE ID), a serving cell of the first terminal equipment, and a sidelink measurement result, and further including the first identification information;

1804: the network device determines according to the measurement report to switch the second terminal equipment to being connected to the network device via the first terminal equipment;

1805: the network device transmits a first RRC reconfiguration message for the second terminal equipment switching to the first terminal equipment, the message simultaneously indicating the second identifier, the first identifier (obtained according to 1803) corresponding to the second identifier, and Uu and PC5 RLC configuration for relay and bearer mapping configuration, and the first terminal equipment completes RLC configuration and bearer mapping configuration of a corresponding PC5 interface and Uu interface according to the first RRC reconfiguration message;

1806: the network device transmits a second RRC reconfiguration message for the second terminal equipment to the second terminal equipment, the message including an identifier of the first terminal equipment (relay UE ID), PC5 RLC configuration of relay services, and related end-to-end radio bearer configuration, and the second terminal equipment determines according the second RRC reconfiguration message to switch to being connected to the network device via which the first terminal equipment;

1807: the first terminal equipment uses or stores a correspondence between the first identifier and the second identifier;

1808: the second terminal equipment transmits an RRC reconfiguration complete message to the network device via the first terminal equipment (corresponding to 1806); and

1809 (optional): the second terminal equipment completes switching, the second terminal equipment and the network device transceive uplink and/or downlink radio bearer data via the first terminal equipment, wherein at the PC5 interface, transmission and/or reception of the uplink and/or downlink radio bearer data may be performed by using a source layer 2 or a destination layer 2 identifier, in a header file of the adaptation layer of the PC5 interface, the carried identifier may be included, and at a Uu interface, the uplink and/or downlink radio bearer data include the second identifier and a Uu radio bearer identifier of the second terminal equipment in the header of the adaptation layer of the Uu interface, so that the network device recognizes the second terminal equipment, that is, determines a second terminal equipment to which the uplink and downlink transmission corresponds.

An order of execution of 1709 and 1807 is not limited thereto, and the embodiment of this disclosure is not limited thereto. In addition, the correspondence between the first identifier and the second identifier may also be used or stored at the network device side, which is not shown in the figures, and shall not be described herein any further.

It can be seen from the above embodiment that the identifier of the second terminal equipment may be configured by the serving network device of the first terminal equipment, so that the first terminal equipment may use the identifier in forwarding the data of the second terminal equipment (such as the RRC message, and the user-plane data, etc.), which is conducive to correctly recognizing the RRC message and user-plane data of the second terminal equipment by the network device.

In the above embodiment, in order to save transmission overhead, a first index may be used to replace the destination identifier for transmission. A length of the first index is less than that of the destination identifier, but is able to uniquely identify the destination identifier. However, if the first index is still used to replace the destination identifier when an SL radio link failure (RLF) is detected in the PC5 interface, as the network device does not learn the destination identifier of the second terminal equipment, it is unable to identify a PC5 interface where an SL RLF is detected. An embodiment of this disclosure provides an information transmission method, in which the first index is carried in information on a sidelink failure transmitted by the first terminal equipment to the network device, while the second identifier or the destination identifier is also carried, so that the network device correctly identifies a PC5 interface where an SL RLF is detected, which shall be described below with reference to the embodiments of the sixth to eighth aspects.

Embodiment of the Sixth Aspect

Th embodiment of this disclosure provides an information transmission method, applicable to a side of a first terminal equipment.

FIG. 19 is a schematic diagram of the information transmission method. As shown in FIG. 19, the method includes:

1901: the first terminal equipment transmits information on a sidelink failure to the network device, the information on a sidelink failure including a destination identifier of at least one second terminal equipment where a sidelink failure occurs, and a second identifier of the second terminal equipment where a sidelink failure occurs and/or a first identifier related to the second terminal equipment where a sidelink failure occurs.

In some embodiments, as described above, in order to save transmission overhead, the first index may be used to replace the destination identifier for transmission. The length of the first index is less than that of the destination identifier, but is able to uniquely identify the destination identifier. For example, the first index may be allocated by the first terminal equipment or the second terminal equipment and notified to another party and/or the network device. When the first index is allocated by the first terminal equipment, the method may further include:

the first terminal equipment allocates the first index and transmits second information indicating the first index to the second terminal equipment. For example, the second information may be carried by a sidelink signaling message or a sidelink RRC message, which is as described in the above embodiments, and shall not be repeated herein any further.

In some embodiments, when the first index is allocated by the second terminal equipment, the method may further include:

the first terminal equipment receives the first information indicating the first index allocated and transmitted by the second terminal equipment. For example, the second information may be carried by a sidelink signaling message or a sidelink RRC message, which is as described in the above embodiments, and shall not be repeated herein any further.

In some embodiments, the method may further include:

the first terminal equipment transmits third information indicating the first index to the network device.

In some embodiments, when the first terminal equipment detects the sidelink RLF of the PC5 interface, it will report the sidelink RLF of the PC5 interface to the network device. For example, detection of the RLF is notified to the network device by using information on sidelink failure, the information on sidelink failure including a destination identifier of at least one second terminal equipment where a sidelink failure occurs, as well as a second identifier of the second terminal equipment where a sidelink failure occurs and/or a first identifier related to the second terminal equipment where a sidelink failure occurs, the first identifier being the first index, and implementation of the second identifier being as described above, which shall not be repeated herein any further.

In some embodiments, the information on a sidelink failure (such as sl-FailureList-r16) may be carried by the SUI. In an existing method, the sl-FailureList-r16 includes the destination identifier of at least one second terminal equipment where a sidelink failure occurs, and in the embodiment of this disclosure, it may further include the first identifier, or the second identifier, or the first identifier and the second identifier.

It can be seen from the above embodiment that the first index is carried in information on a sidelink failure transmitted by the first terminal equipment to the network device, while the second identifier or the destination identifier is also carried, so that the network device correctly identifies a PC5 interface where an SL RLF is detected.

Embodiment of the Seventh Aspect

Th embodiment of this disclosure provides an information reception method, applicable to a side of a network device.

FIG. 20 is a schematic diagram of the information reception method. As shown in FIG. 20, the method includes:

2001: the network device receives information on a sidelink failure transmitted by a first terminal equipment, the information on a sidelink failure including a destination identifier of at least one second terminal equipment where a sidelink failure occurs, and a second identifier of the second terminal equipment where a sidelink failure occurs and/or a first identifier related to the second terminal equipment where a sidelink failure occurs.

In some embodiments, reference may be made to 1901 for implementation of 2001, and implementations of the first identifier and second identifier are as described above, which shall not be repeated herein any further.

In some embodiments, the method may further include:

the network device receives third information indicating the first index transmitted by the first terminal equipment, so as to determine a first index allocated by the first terminal equipment or the second terminal equipment for the destination identifier.

It can be seen from the above embodiment that the first index is carried in information on a sidelink failure transmitted by the first terminal equipment to the network device, while the second identifier or the destination identifier is also carried, so that the network device correctly identifies a PC5 interface where an SL RLF is detected.

Embodiment of the Eighth Aspect

The embodiment of this disclosure provides an information transceiving method, applicable to a side of a second network device.

FIG. 21 is a schematic diagram of the information transceiving method. As shown in FIG. 21, the method includes:

2101: the second terminal equipment allocates a first index and transmits first information indicating the first index to a first terminal equipment, or, receives second information indicating the first index transmitted by the first terminal equipment, the first index corresponding to a destination identifier of the second terminal equipment.

In some embodiments, the method may further include:

the network device receives third information indicating the first index transmitted by the first terminal equipment, so as to determine a first index allocated by the first terminal equipment or the second terminal equipment for the destination identifier.

For example, the first information or the second information may be carried by a sidelink signaling message or a sidelink RRC message. The sidelink signaling message or the sidelink RRC message is as described in the above embodiments, and reference may be made to the embodiment of the sixth aspect for implementation of the first index, which shall not be described herein any further.

It should be noted that FIGS. 6-21 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIGS. 6-21.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner. For example, in the embodiments of the first to fifth aspects, when the first identifier is the first index, the embodiments of the first to fifth aspects may be combined with the embodiments of the sixth to eighth aspects for implementation.

Embodiment of the Ninth Aspect

The embodiment of this disclosure provides an information transmission/reception apparatus, configured in a first terminal equipment.

Figure 22:
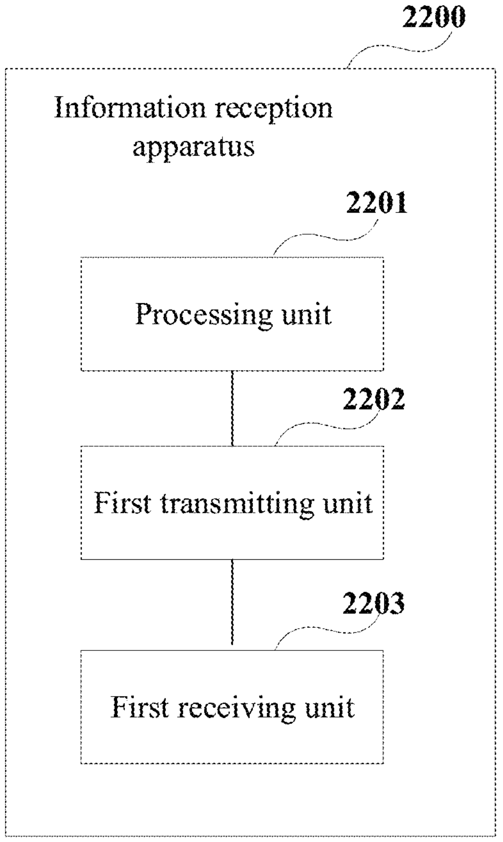
FIG. 22 is a schematic diagram of the information reception apparatus of an embodiment of this disclosure.

FIG. 22 is a schematic diagram of the information reception apparatus of the embodiment of this disclosure, which shall be described from a side of a first terminal equipment. A principle of implementation of the information reception apparatus in the embodiment of this disclosure is similar to the implementation of the embodiment of the first aspect, with identical contents being not to be repeated herein any further.

As shown in FIG. 22, an information reception apparatus 2200 of the embodiment of this disclosure includes:

a processing unit 2201 configured to establish connection with at least one second terminal equipment;

a first transmitting unit 2202 configured to transmit first identification information to a network device, the first identification information being used to indicate a first identifier related to the at least one second terminal equipment; and a first receiving unit 2203 configured to receive second identification information transmitted by the network device, the second identification information being used to indicate a second identifier of the at least one second terminal equipment.

In some embodiments, the first identification information is carried by SUI or a second RRC message for the first terminal equipment.

In some embodiments, the first terminal equipment is in an RRC connected mode, or, when the first terminal equipment is in an RRC idle or inactive mode, the apparatus further includes (not shown, optional):

a second receiving unit configured to receive a first RRC message for the second terminal equipment transmitted by the second terminal equipment, and enter the RRC connected mode.

In some embodiments, the second RRC message for the first terminal equipment includes RRC setup request or RRC setup complete or RRC resume request or RRC resume complete.

In some embodiments, the first RRC message for the second terminal equipment includes an RRC setup request or an RRC re-establishment request or an RRC resume request message.

In some embodiments, when a first triggering condition is satisfied, the first transmitting unit transmits first identification information to the network device, the first triggering condition including at least one of the following conditions that:

the first terminal equipment establishes connection with the second terminal equipment;

a sidelink capability message is transmitted between the first terminal equipment and the second terminal equipment; or the first terminal equipment receives a first RRC message for the second terminal equipment transmitted by the second terminal equipment.

In some embodiments, the first identifier is a destination ID or a first index, and/or an identifier of a PC5 unicast link, and/or an identifier of PC5-RRC connection, and/or a pair of source identifier and destination identifier.

In some embodiments, the first identification information includes a first identifier related to one second terminal equipment, the one second terminal equipment being a terminal equipment newly establishing connection with the first terminal equipment, or the first identification information includes first identifiers related to all second terminal equipment establishing connection with the first terminal equipment.

In some embodiments, the second identifier is a local/temporary identifier of the second terminal equipment.

In some embodiments, the local/temporary identifier includes at least one of the following:

a second index of the second terminal equipment, the second index being used to uniquely identify a second terminal equipment having a connection relationship with the first terminal equipment;

a C-RNTI of the second terminal equipment; and a part of a destination identifier of the second terminal equipment.

In some embodiments, the second identification information is carried by a fourth RRC message for the first terminal equipment or a third RRC message for the first terminal equipment, the fourth RRC message including an RRC reconfiguration or RRC re-establishment or RRC resume message, and the third RRC message for the first terminal equipment including RRC setup or RRC resume or RRC reconfiguration.

In some embodiments, an order of arrangement of second identifiers in the second identification information is identical to an order of presence of the first identifier related to the at least one second terminal equipment in the first identification information.

In some embodiments, the third RRC message is further used to indicate the first identifier corresponding to the second identifier, and/or the fourth RRC message is further used to indicate the first identifier corresponding to the second identifier.

In some embodiments, the apparatus further includes (not shown, optional):

a first storing unit configured to use or store a correspondence between the first identifier and the second identifier.

In some embodiments, the apparatus further includes (not shown, optional):

a second transmitting unit configured to transmit information on sidelink failure to the network device, the information on sidelink failure including a destination identifier of at least one second terminal equipment where sidelink failure occurs, and a second identifier of the second terminal equipment where sidelink failure occurs and/or a first identifier related to the second terminal equipment where sidelink failure occurs.

Reference may be made to the embodiment of the first aspect for implementations of the above unit modules, which shall not be repeated herein any further.

Figure 23:
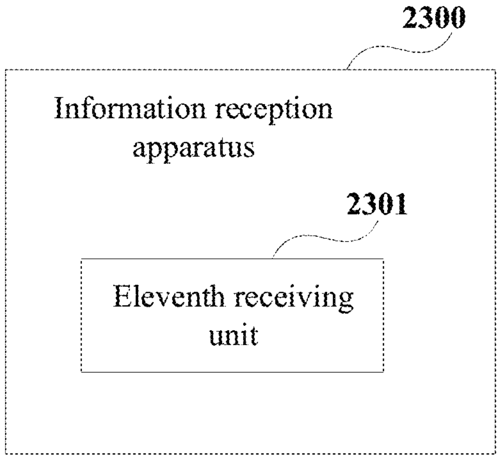
FIG. 23 is a schematic diagram of the information reception apparatus of an embodiment of this disclosure.

FIG. 23 is a schematic diagram of the information reception apparatus of the embodiment of this disclosure, which shall be described from a side of a first terminal equipment. A principle of implementation of the information reception apparatus in the embodiment of this disclosure is similar to the implementation of the embodiment of the fourth aspect, with identical contents being not to be repeated herein any further.

As shown in FIG. 23, an information reception apparatus 2300 of the embodiment of this disclosure includes:

an eleventh receiving unit 2301 configured to receive second identification information transmitted by a network device, the second identification information being used to indicate a second identifier of the second terminal equipment, wherein the second terminal equipment determines to switch to being connected to the network device via the first terminal equipment.

In some embodiments, the apparatus further includes (not shown, optional):

a twelfth receiving unit configured to receive the second identification information transmitted by the second terminal equipment.

In some embodiments, the second identification information received by the twelfth receiving unit is carried by a sidelink signaling message or sidelink RRC message between the first terminal equipment and the second terminal equipment, the sidelink signaling message or sidelink RRC message being also used to indicate the first identifier.

In some embodiments, the second identification information received by the eleventh receiving unit is carried by a first RRC reconfiguration message.

In some embodiments, the first RRC reconfiguration message is also used to indicate the first identifier corresponding to the second identifier.

In some embodiments, the apparatus further includes (not shown, optional):

a fifth storage unit configured to use or store a correspondence between the first identifier and the second identifier.

In some embodiments, the apparatus further includes (not shown, optional):

a thirteenth transmitting unit configured to transmit the first identification information and the corresponding second identification information to the network device.

In some embodiments, the first identification information and the corresponding second identification information are carried by SUI.

In some embodiments, the first identification information and the corresponding second identification information are newly added information elements in the SUI, or are included in a sidelink failure information element, or are included in sidelink transmission resource request information element.

Reference may be made to the embodiment of the fourth aspect for implementations of the above unit modules, which shall not be repeated herein any further.

Figure 24:
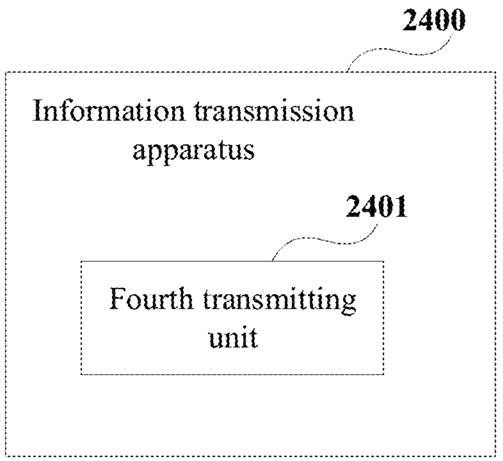
FIG. 24 is a schematic diagram of the information transmission apparatus of an embodiment of this disclosure.

FIG. 24 is a schematic diagram of the information transmission apparatus of the embodiment of this disclosure, which shall be described from a side of a first terminal equipment. A principle of implementation of the information transmission apparatus in the embodiment of this disclosure is similar to the implementation of the embodiment of the sixth aspect, with identical contents being not to be repeated herein any further.

As shown in FIG. 24, an information transmission apparatus 2400 of the embodiment of this disclosure includes:

a fourth transmitting unit 2401 configured to transmit information on a sidelink failure to the network device, the information on a sidelink failure including a destination identifier of at least one second terminal equipment where a sidelink failure occurs, and a second identifier of the second terminal equipment where a sidelink failure occurs and/or a first identifier related to the second terminal equipment where a sidelink failure occurs.

In some embodiments, the second identifier is a local/temporary identifier of the second terminal equipment.

In some embodiments, the local/temporary identifier includes at least one of the following:

a second index of the second terminal equipment, the second index being used to uniquely identify a second terminal equipment;

a C-RNTI of the second terminal equipment; and a part of a destination identifier of the second terminal equipment.

In some embodiments, the first identifier is a first index of the second terminal equipment.

In some embodiments, the apparatus further includes (not shown, optional):

a fifth receiving unit configured to receive the first information indicating the first index allocated and transmitted by the second terminal equipment; or, a fifth transmitting unit configured to allocate the first index and transmit the second information indicating the first index to the second terminal equipment.

In some embodiments, the first information and/or the second information is/are carried by a PC5-RRC message or a PC5-S message.

Reference may be made to the embodiment of the sixth aspect for implementations of the above unit modules, which shall not be repeated herein any further.

It should be noted that the components or modules related to this disclosure are only described above. However, this disclosure is not limited thereto, and the information transmission/reception apparatuses 2200/2300/2400 may further include other components or modules, and reference may be made to related techniques for particulars of these components or modules.

Furthermore, for the sake of simplicity, connection relationships between the components or modules or signal profiles thereof are only illustrated in FIGS. 22-24. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

Embodiment of the Tenth Aspect

The embodiment of this disclosure provides an information transceiving apparatus, configured in a second terminal equipment.

Figure 25:
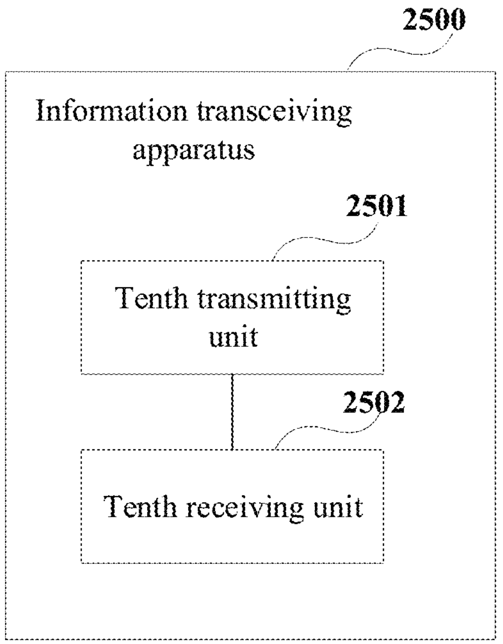
FIG. 25 is a schematic diagram of an information transceiving apparatus of an embodiment of this disclosure.

FIG. 25 is a schematic diagram of the information reception apparatus of the embodiment of this disclosure, which shall be described from a side of a second terminal equipment. A principle of implementation of the information transmission apparatus in the embodiment of this disclosure is similar to the implementation of the embodiment of the fifth aspect, with identical contents being not to be repeated herein any further.

A tenth transmitting unit 2501 configured to transmit first identification information to a network device, the first identification information being used to indicate a first identifier related to the second terminal equipment; and/or, a tenth receiving unit 2502 configured to receive second identification information transmitted by the network device, the second identification information being used to indicate a second identifier of the second terminal equipment.

In some embodiments, the apparatus further includes (optional, not shown):

an eleventh transmitting unit configured to transmit the second identification information to the first terminal equipment.

In some embodiments, the second identification information is carried by a sidelink signaling message or sidelink RRC message between the first terminal equipment and the second terminal equipment, the sidelink signaling message or sidelink RRC message being also used to indicate the first identifier.

In some embodiments, the tenth receiving unit receives the second identification information transmitted by the network device via a second RRC reconfiguration message.

In some embodiments, the tenth transmitting unit transmits the first identification information to the network device via a measurement report message.

Figure 26:
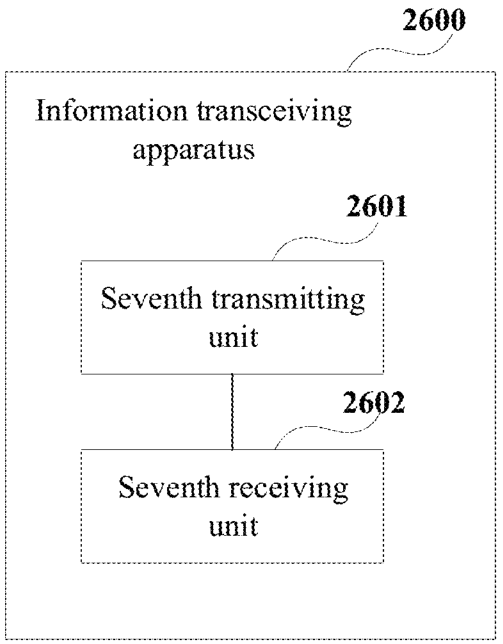
FIG. 26 is a schematic diagram of an information transceiving apparatus of an embodiment of this disclosure.

FIG. 26 is a schematic diagram of the information transceiving apparatus of the embodiment of this disclosure, which shall be described from a side of a second terminal equipment. A principle of implementation of the information transceiving apparatus in the embodiment of this disclosure is similar to the implementation of the embodiment of the eighth aspect, with identical contents being not to be repeated herein any further.

A seventh transmitting unit 2601 configured to allocate a first index and transmit first information indicating the first index to a first terminal equipment, or, a seventh receiving unit 2602 configured to receive second information indicating the first index transmitted by the first terminal equipment, the first index corresponding to a destination identifier of the second terminal equipment.

Reference may be made to the embodiment of the fifth or eighth aspect for implementations of the above unit modules, which shall not be repeated herein any further.

It should be noted that the components or modules related to this disclosure are only described above. However, this disclosure is not limited thereto, and the information transceiving apparatuses 2500-2600 may further include other components or modules, and reference may be made to related techniques for particulars of these components or modules.

Furthermore, for the sake of simplicity, connection relationships between the components or modules or signal profiles thereof are only illustrated in FIGS. 25-26. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

Embodiment of the Eleventh Aspect

The embodiment of this disclosure provides an information transmission/reception apparatus, configured in a network device.

Figure 27:
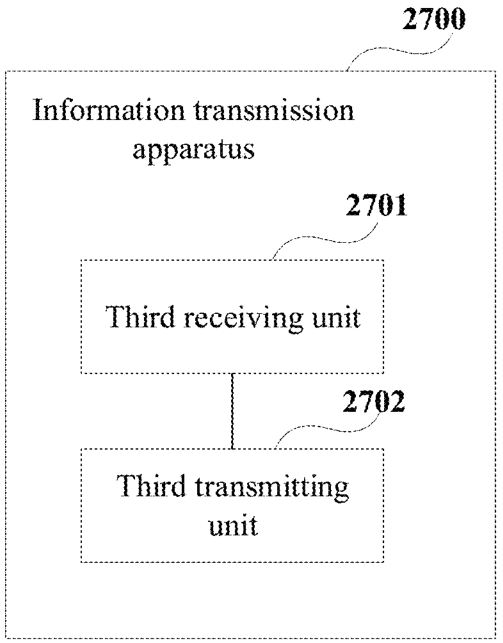
FIG. 27 is a schematic diagram of an information transmission apparatus of an embodiment of this disclosure.

FIG. 27 is a schematic diagram of the information transmission apparatus of the embodiment of this disclosure, which shall be described from a side of a network device. A principle of implementation of the information transmission apparatus in the embodiment of this disclosure is similar to the implementation of the embodiment of the second aspect, with identical contents being not to be repeated herein any further.

As shown in FIG. 27, an information transmission apparatus 2700 of the embodiment of this disclosure includes:

a third receiving unit 2701 configured to receive first identification information transmitted by a first terminal equipment, the first identification information being used to indicate a first identifier related to at least one second terminal equipment connected to the first terminal equipment; and a third transmitting unit 2702 configured to transmit second identification information to the first terminal equipment, the second identification information being used to indicate second identifier of at least one second terminal equipment.

In some embodiments, the first identification information is carried by SUI or a second RRC message for the first terminal equipment.

In some embodiments, the second RRC message for the first terminal equipment includes RRC setup request or RRC setup complete or RRC resume request or RRC resume complete.

In some embodiments, when a first triggering condition is satisfied, the third receiving unit receives first identification information transmitted by the first terminal equipment, the first triggering condition including at least one of the following conditions that:

the first terminal equipment establishes connection with the second terminal equipment;

a sidelink capability message is transmitted between the first terminal equipment and the second terminal equipment; or the first terminal equipment receives a first RRC message for the second terminal equipment transmitted by the second terminal equipment.

In some embodiments, the first identifier is a destination ID or a first index.

In some embodiments, the first identification information includes a first identifier related to one second terminal equipment, the one second terminal equipment being a terminal equipment newly establishing connection with the first terminal equipment, or the first identification information includes first identifiers related to all second terminal equipments establishing connection with the first terminal equipment.

In some embodiments, the second identifier is a local/temporary identifier of the second terminal equipment.

In some embodiments, the local/temporary identifier includes at least one of the following:

a second index of the second terminal equipment, the second index being used to uniquely identify a second terminal equipment having a connection relationship with the first terminal equipment;

a C-RNTI of the second terminal equipment; and a part of a destination identifier of the second terminal equipment.

In some embodiments, the second identification information is carried by a fourth RRC message for the first terminal equipment or a third RRC message for the first terminal equipment, the fourth RRC message including an RRC reconfiguration or RRC re-establishment or RRC resume message, and the third RRC message for the first terminal equipment including RRC setup or RRC resume or RRC reconfiguration.

In some embodiments, an order of arrangement of second identifiers in the second identification information is identical to an order of presence of the first identifier related to the at least one second terminal equipment in the first identification information.

In some embodiments, the third RRC message is further used to indicate the first identifier corresponding to the second identifier, and/or the fourth RRC message is further used to indicate the first identifier corresponding to the second identifier.

In some embodiments, the apparatus further includes (not shown, optional):

a second storing unit configured to use or store a correspondence between the first identifier and the second identifier.

In some embodiments, the apparatus further includes (not shown, optional):

a third storing unit configured to use or store a correspondence between the first identifier, the second identifier and an allocated C-RNTI.

In some embodiments, the apparatus further includes (not shown, optional):

a fourth receiving unit receive information on sidelink failure transmitted by the first terminal equipment, the information on sidelink failure including a destination identifier of at least one second terminal equipment where sidelink failure occurs, and a second identifier of the second terminal equipment where sidelink failure occurs and/or a first identifier related to the second terminal equipment where sidelink failure occurs.

Reference may be made to the embodiment of the second aspect for implementations of the above unit modules, which shall not be repeated herein any further.

Figure 28:
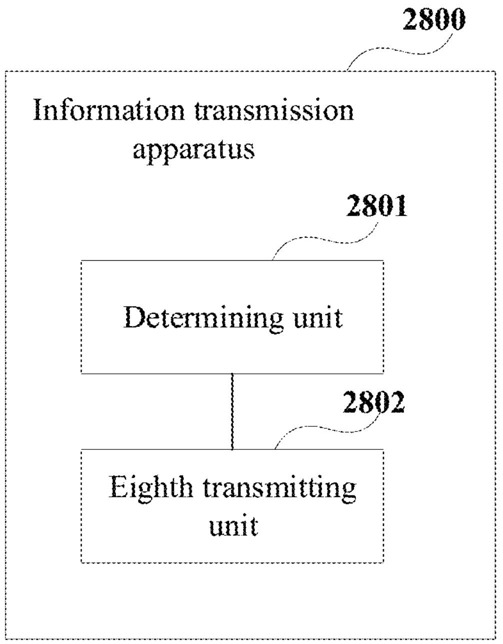
FIG. 28 is a schematic diagram of an information transmission apparatus of an embodiment of this disclosure.

FIG. 28 is a schematic diagram of the information transmission apparatus of the embodiment of this disclosure, which shall be described from a side of a network device. A principle of implementation of the information transmission apparatus in the embodiment of this disclosure is similar to the implementation of the embodiment of the third aspect, with identical contents being not to be repeated herein any further.

As shown in FIG. 28, an information transmission apparatus 2800 of the embodiment of this disclosure includes:

a determining unit 2801 configured to determine to switch the second terminal equipment to being connected to the network device via a first terminal equipment; and an eighth transmitting unit 2802 configured to transmit second identification information to the first terminal equipment, the second identification information being used to indicate a second identifier of the second terminal equipment.

In some embodiments, the apparatus further includes (not shown, optional):

a ninth transmitting unit configured to transmit the second identification information to the second terminal equipment.

In some embodiments, the apparatus further includes (not shown, optional):

an eighth receiving unit configured to receive the first identification information transmitted by the first terminal equipment and the corresponding second identification information after the first terminal equipment and the second terminal equipment establish connection, the first identification information being used to indicate the first identifier related to the second terminal equipment.

In some embodiments, the apparatus further includes (not shown, optional):

a fourth storage unit configured to use or store a correspondence between the first identifier and the second identifier.

In some embodiments, the second identification information transmitted by the eighth transmitting unit is carried by a first RRC reconfiguration message.

In some embodiments, the second identification information transmitted by the ninth transmitting unit is carried by a second RRC reconfiguration message.

In some embodiments, the apparatus further includes (not shown, optional):

a ninth receiving unit configured to receive the first identification information transmitted by the second terminal equipment after the first terminal equipment and the second terminal equipment establish connection, the first identification information being used to indicate the first identifier related to the second terminal equipment.

In some embodiments, the first identification information is carried by a measurement report message.

In some embodiments, the first RRC reconfiguration message is further used to indicate the first identifier corresponding to the second identifier.

In some embodiments, the first identification information and the corresponding second identification information are carried by SUI.

In some embodiments, the first identification information and the corresponding second identification information are newly added information elements in the SUI, or are included in a sidelink failure information element, or are included in a sidelink transmission resource request information element.

Reference may be made to the embodiment of the third aspect for implementations of the above unit modules, which shall not be repeated herein any further.

Figure 29:
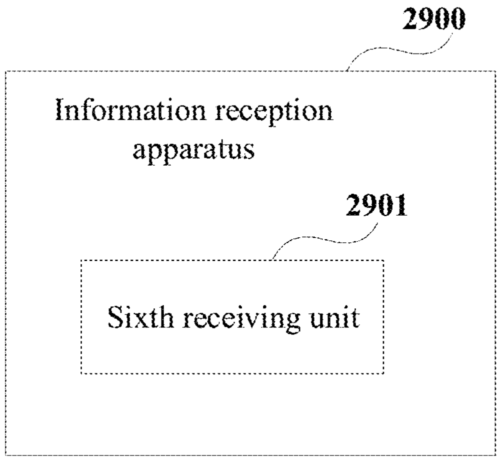
FIG. 29 is a schematic diagram of an information reception apparatus of an embodiment of this disclosure.

FIG. 29 is a schematic diagram of the information reception apparatus of the embodiment of this disclosure, which shall be described from a side of a network device. A principle of implementation of the information transmission apparatus in the embodiment of this disclosure is similar to the implementation of the embodiment of the seventh aspect, with identical contents being not to be repeated herein any further.

As shown in FIG. 29, an information reception apparatus 2900 of the embodiment of this disclosure includes:

a sixth receiving unit 2901 configured to receive information on a sidelink failure transmitted by a first terminal equipment, the information on a sidelink failure including a destination identifier of at least one second terminal equipment where a sidelink failure occurs, and a second identifier of the second terminal equipment where a sidelink failure occurs and/or a first identifier related to the second terminal equipment where a sidelink failure occurs.

In some embodiments, the second identifier is a local/temporary identifier of the second terminal equipment.

In some embodiments, the local/temporary identifier includes at least one of the following:

a second index of the second terminal equipment, the second index being used to uniquely identify a second terminal equipment;

a C-RNTI of the second terminal equipment; and a part of a destination identifier of the second terminal equipment.

In some embodiments, the first identifier is a first index of the second terminal equipment.

In some embodiments, the first index is allocated by the first terminal equipment or the second terminal equipment.

Reference may be made to the embodiment of the seventh aspect for implementations of the above unit modules, which shall not be repeated herein any further.

It should be noted that the components or modules related to this disclosure are only described above. However, this disclosure is not limited thereto, and the information transmission/reception apparatuses 2700-2900 may further include other components or modules, and reference may be made to related techniques for particulars of these components or modules.

Furthermore, for the sake of simplicity, connection relationships between the components or modules or signal profiles thereof are only illustrated in FIGS. 27-29. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

Embodiment of the Twelfth Aspect

Figure 30:
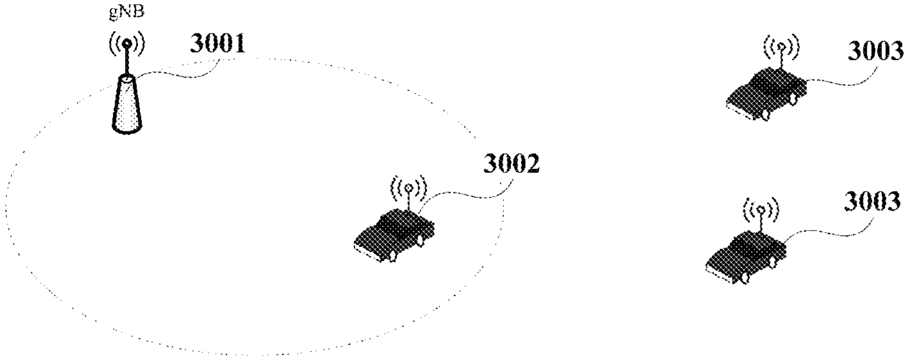
FIG. 30 is a schematic diagram of the communication system of an embodiment of this disclosure.

The embodiment of this disclosure provides a communication system. FIG. 30 is a schematic diagram of the communication system. As shown in FIG. 30, the communication system includes a network device 3001, a first terminal equipment 3002 and at least one second terminal equipment 3003.

In some embodiments, the network device 3001 is configured to execute the method executed by the network device in the embodiment of the second or the third or the seventh aspect, and may include any of the apparatuses shown in FIGS. 27-29. In some embodiments, the first terminal equipment 3002 is configured to execute the method in the embodiment of the first or the fourth or the sixth aspect, and may include any of the apparatuses shown in FIGS. 22-24. In some embodiments, the second terminal equipment 3003 is configured to execute the method in the embodiment of the fifth or the eighth aspect, and may include any of the apparatuses shown in FIGS. 25 and 26.

The embodiment of this disclosure further provides a terminal equipment.

Figure 31:
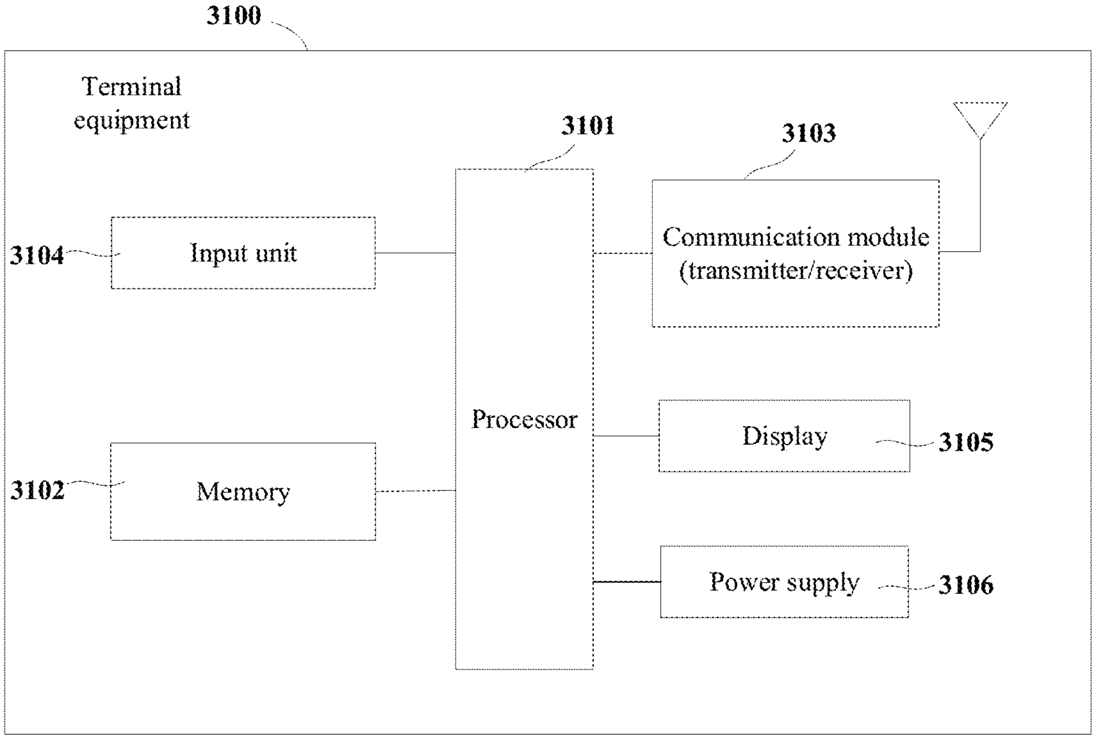
FIG. 31 is a schematic diagram of the terminal equipment of an embodiment of this disclosure.

FIG. 31 is a schematic diagram of the terminal equipment of the embodiment of this disclosure. As shown in FIG. 31, a terminal equipment 3100 may include a processor 3101 and a memory 3102, the memory 3102 storing data and a program and being coupled to the processor 3101. It should be noted that this figure is illustrative only, and other types of structures may also be used, so as to supplement or replace this structure and achieve a telecommunications function or other functions.

For example, the processor 3101 may be configured to execute a program to carry out the method as described in the embodiment of the first or the fourth or the sixth aspect.

As shown in FIG. 31, the terminal equipment 3100 may further include a communication module 3103, an input unit 3104, a display 3105, and a power supply 3106, wherein functions of the above components are similar to those in the related art, which shall not be described herein any further. It should be noted that the terminal equipment 3100 does not necessarily include all the parts shown in FIG. 31, and the above components are not necessary. Furthermore, the terminal equipment 3100 may include parts not shown in FIG. 31, and the related art may be referred to.

The embodiment of this disclosure further provides a network device.

Figure 32:
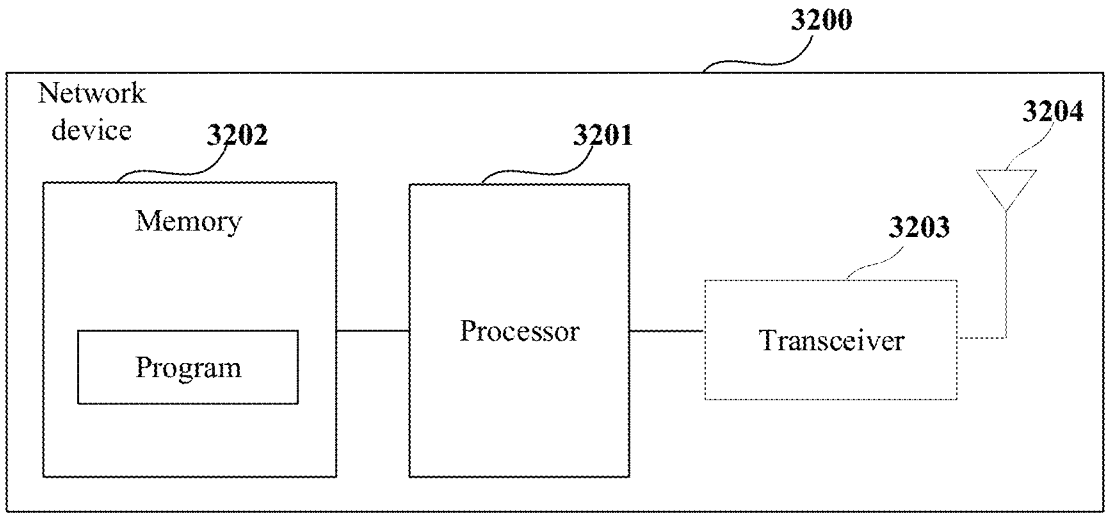
FIG. 32 is a schematic diagram of the network device of an embodiment of this disclosure.

FIG. 32 is a schematic diagram of the network device of the embodiment of this disclosure. As shown in FIG. 32, a network device 3200 may include a processor (such as a central processing unit (CPU)) 3201 and a memory 3202, the memory 3202 being coupled to the processor 3201. The memory 3202 may store various data, and furthermore, it may store a program for information processing, and execute the program under control of the processor 3201.

For example, the processor 3201 may be configured to execute a program to carry out the method as described in the embodiment of the second or the third or the seventh aspect.

Furthermore, as shown in FIG. 32, the network device 3200 may include a transceiver 3203, and an antenna 3204, etc. Functions of the above components are similar to those in the related art, and shall not be described herein any further. It should be noted that the network device 3200 does not necessarily include all the parts shown in FIG. 32, and furthermore, the network device 3200 may include parts not shown in FIG. 32, and the related art may be referred to.

An embodiment of this disclosure provides a computer readable program, which, when executed in a terminal equipment, causes a computer to carry out the method as described in the embodiment of the first or the fourth to sixth or the eighth aspect in the first terminal equipment.

An embodiment of this disclosure provides a computer storage medium, including a computer readable program, which causes a computer to carry out the method as described in the embodiment of the first or the fourth to sixth or the eighth aspect in a terminal equipment.

An embodiment of this disclosure provides a computer readable program, which, when executed in a network device, causes a computer to carry out the method as described in the embodiment of the second or the third or the seventh aspect in the network device.

An embodiment of this disclosure provides a computer storage medium, including a computer readable program, which causes a computer to carry out the method as described in the embodiment of the second or the third or the seventh aspect in a network device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

As to implementations containing the above embodiments, following supplements are further disclosed.

1. An information transmission method, applicable to a first terminal equipment, characterized in that the method includes:

establishing connection with at least one second terminal equipment by the first terminal equipment; and transmitting first identification information to a network device by the first terminal equipment, the first identification information being used to indicate a first identifier related to the at least one second terminal equipment.

2. The method according to supplement 1, wherein the first identification information is carried by SUI or a second RRC message for the first terminal equipment.

3. The method according to supplement 1 or 2, wherein the first terminal equipment is in an RRC connected mode, or, when the first terminal equipment is in an RRC idle or inactive mode, the method further includes:

receiving, by the first terminal equipment, a first RRC message for the second terminal equipment transmitted by the second terminal equipment, and entering the RRC connected mode.

4. The method according to supplement 2, wherein the second RRC message for the first terminal equipment includes RRC setup request or RRC setup complete or RRC resume request or RRC resume complete.

5. The method according to supplement 3, wherein the first RRC message for the second terminal equipment includes an RRC setup request or an RRC re-establishment request or an RRC resume request message.

6. The method according to any one of supplements 1-5, wherein when a first triggering condition is satisfied, the first terminal equipment transmits first identification information to the network device, the first triggering condition including at least one of the following conditions that:

the first terminal equipment establishes connection with the second terminal equipment;

a sidelink capability message is transmitted between the first terminal equipment and the second terminal equipment; or the first terminal equipment receives a first RRC message for the second terminal equipment transmitted by the second terminal equipment.

7. The method according to any one of supplements 1-6, wherein the first identifier is a destination ID or a first index, and/or an identifier of a PC5 unicast link, and/or an identifier of PC5-RRC connection, and/or a pair of source identifier and destination identifier.

8. The method according to any one of supplements 1-7, wherein the first identification information includes a first identifier related to one second terminal equipment, the one second terminal equipment being a terminal equipment newly establishing connection with the first terminal equipment, or the first identification information includes first identifiers related to all second terminal equipments establishing connection with the first terminal equipment.

9. The method according to any one of supplements 1-8, wherein the method further includes:

receiving, by the first terminal equipment, second identification information transmitted by the network device, the second identification information being used to indicate a second identifier of the at least one second terminal equipment.

10. The method according supplement 9, wherein the second identifier is a local/temporary identifier of the second terminal equipment.

11. The method according to supplement 10, wherein the local/temporary identifier includes at least one of the following:

a second index of the second terminal equipment, the second index being used to uniquely identify a second terminal equipment having a connection relationship with the first terminal equipment;

a C-RNTI of the second terminal equipment; and a part of a destination identifier of the second terminal equipment.

12. The method according to supplement 9 or 10 or 11, wherein the second identification information is carried by a fourth RRC message for the first terminal equipment or a third RRC message for the first terminal equipment, the fourth RRC message including an RRC reconfiguration or RRC re-establishment or RRC resume message, and the third RRC message for the first terminal equipment including RRC setup or RRC resume or RRC reconfiguration.

13. The method according to any one of supplements 9-12, wherein an order of arrangement of second identifiers in the second identification information is identical to an order of presence of the first identifier related to the at least one second terminal equipment in the first identification information.

14. The method according to supplement 12, wherein the third RRC message is further used to indicate the first identifier corresponding to the second identifier, and/or the fourth RRC message is further used to indicate the first identifier corresponding to the second identifier.

15. The method according to any one of supplements 1-14, wherein the method further includes:

using or storing a correspondence between the first identifier and the second identifier by the first terminal equipment.

16. The method according to any one of supplements 1-15, wherein the method further includes:

transmitting, by the first terminal equipment, information on sidelink failure to the network device, the information on sidelink failure including a destination identifier of at least one second terminal equipment where sidelink failure occurs, and a second identifier of the second terminal equipment where sidelink failure occurs and/or a first identifier related to the second terminal equipment where sidelink failure occurs.

17. An information reception method, applicable to a network device, characterized in that the method includes:

receiving, by the network device, first identification information transmitted by a first terminal equipment, the first identification information being used to indicate a first identifier related to at least one second terminal equipment connected to the first terminal equipment.

18. The method according to supplement 17, wherein the first identification information is carried by SUI or a second RRC message for the first terminal equipment.

19. The method according to supplement 2, wherein the second RRC message for the first terminal equipment includes RRC setup request or RRC setup complete or RRC resume request or RRC resume complete.

20. The method according to any one of supplements 17-19, wherein when a first triggering condition is satisfied, the network device receives first identification information transmitted by the first terminal equipment, the first triggering condition including at least one of the following conditions that:

the first terminal equipment establishes connection with the second terminal equipment;

a sidelink capability message is transmitted between the first terminal equipment and the second terminal equipment; or the first terminal equipment receives a first RRC message for the second terminal equipment transmitted by the second terminal equipment.

21. The method according to any one of supplements 17-20, wherein the first identifier is a destination ID or a first index, and/or an identifier of a PC5 unicast link, and/or an identifier of PC5-RRC connection, and/or a pair of source identifier and destination identifier.

22. The method according to any one of supplements 17-21, wherein the first identification information includes a first identifier related to one second terminal equipment, the one second terminal equipment being a terminal equipment newly establishing connection with the first terminal equipment, or the first identification information includes first identifiers related to all second terminal equipments establishing connection with the first terminal equipment.

23. The method according to any one of supplements 17-22, wherein the method further includes:

transmitting second identification information by the network device to the first terminal equipment, the second identification information being used to indicate a second identifier of the at least one second terminal equipment.

24. The method according to supplement 23, wherein the second identifier is a local/temporary identifier of the second terminal equipment.

25. The method according to supplement 24, wherein the local/temporary identifier includes at least one of the following:

a second index of the second terminal equipment, the second index being used to uniquely identify a second terminal equipment having a connection relationship with the first terminal equipment;

a C-RNTI of the second terminal equipment; and a part of a destination identifier of the second terminal equipment.

26. The method according to supplement 23 or 24 or 25, wherein the second identification information is carried by a fourth RRC message for the first terminal equipment or a third RRC message for the first terminal equipment, the fourth RRC message including an RRC reconfiguration or RRC re-establishment or RRC resume message, and the third RRC message for the first terminal equipment including RRC setup or RRC resume or RRC reconfiguration.

27. The method according to any one of supplements 23-25, wherein an order of arrangement of second identifiers in the second identification information is identical to an order of presence of the first identifier related to the at least one second terminal equipment in the first identification information.

28. The method according to supplement 26, wherein the third RRC message is further used to indicate the first identifier corresponding to the second identifier, and/or the fourth RRC message is further used to indicate the first identifier corresponding to the second identifier.

29. The method according to any one of supplements 17-28, wherein the method further includes:

using or storing a correspondence between the first identifier and the second identifier by the network device.

30. The method according to any one of supplements 17-28, wherein the method further includes:

using or storing a correspondence between the first identifier, the second identifier and an allocated C-RNTI by the network device.

31. The method according to any one of supplements 17-30, wherein the method further includes:

receiving, by the network device, information on sidelink failure transmitted by the first terminal equipment, the information on sidelink failure including a destination identifier of at least one second terminal equipment where sidelink failure occurs, and a second identifier of the second terminal equipment where sidelink failure occurs and/or a first identifier related to the second terminal equipment where sidelink failure occurs.

32. An information transmission method, applicable to a first terminal equipment, characterized in that the method includes:

transmitting information on sidelink failure by the first terminal equipment to a network device, the information on sidelink failure including a destination identifier of at least one second terminal equipment where sidelink failure occurs, and a second identifier of the second terminal equipment where sidelink failure occurs and/or a first identifier related to the second terminal equipment where sidelink failure occurs.

33. The method according to supplement 32, wherein the second identifier is a local/temporary identifier of the second terminal equipment.

34. The method according to supplement 33, wherein the local/temporary identifier includes at least one of the following:

a second index of the second terminal equipment, the second index being used to uniquely identify a second terminal equipment;

a C-RNTI of the second terminal equipment; and a part of a destination identifier of the second terminal equipment.

35. The method according to supplement 32, wherein the first identifier is a first index of the second terminal equipment.

36. The method according to supplement 35, wherein the method further includes:

receiving, by the first terminal equipment, the first information indicating the first index allocated and transmitted by the second terminal equipment, or, allocating the first index and transmitting second information indicating the first index by the first terminal equipment to the second terminal equipment.

37. The method according to supplement 36, wherein the first information and/or the second information is/are carried by a PC5-RRC message or a PC5-S message.

38. An information reception method, applicable to a network device, characterized in that the method includes:

receiving, by the network device, information on sidelink failure transmitted by a first terminal equipment, the information on sidelink failure including a destination identifier of at least one second terminal equipment where sidelink failure occurs, and a second identifier of the second terminal equipment where sidelink failure occurs and/or a first identifier related to the second terminal equipment where sidelink failure occurs.

39. The method according to supplement 38, wherein the second identifier is a local/temporary identifier of the second terminal equipment.

40. The method according to supplement 39, wherein the local/temporary identifier includes at least one of the following:

a second index of the second terminal equipment, the second index being used to uniquely identify a second terminal equipment;

a C-RNTI of the second terminal equipment; and a part of a destination identifier of the second terminal equipment.

41. The method according to supplement 38, wherein the first identifier is a first index of the second terminal equipment.

42. The method according to supplement 41, wherein the first index is allocated by the first terminal equipment or is allocated by the second terminal equipment.

43. An information transmission method, applicable to a second terminal equipment, characterized in that the method includes:

allocating a first index and transmitting first information indicating the first index by the second terminal equipment to a first terminal equipment, or, receiving, by the second terminal equipment, second information indicating the first index transmitted by the first terminal equipment, the first index corresponding to a destination identifier of the second terminal equipment.

44. An information transmission method, applicable to a network device, characterized in that the method includes:

determining by the network device to switch the second terminal equipment to being connected to the network device via a first terminal equipment;

transmitting second identification information by the network device to the first terminal equipment, the second identification information being used to indicate a second identifier of the second terminal equipment.

45. The method according to supplement 44, wherein the method further includes:

transmitting the second identification information by the network device to the second terminal equipment.

46. The method according to supplement 44 or 45, wherein the method further includes:

receiving first identification information and the corresponding second identification information transmitted by the first terminal equipment, by the network device after the first terminal equipment establishes connection with the second terminal equipment, the first identification information being used to indicate a first identifier related to the second terminal equipment.

47. The method according to supplement 46, wherein the method further includes:

using or storing a correspondence between the first identifier and the second identifier by the network device.

48. The method according to any one of supplements 44-47, wherein the second identification information transmitted by the network device to the first terminal equipment is carried by a first RRC reconfiguration message, and the second identification information transmitted by the network device to the second terminal equipment is carried by a second RRC reconfiguration message.

49. The method according to supplement 44 or 45, wherein the method further includes:

receiving first identification information transmitted by the second terminal equipment, by the network device after the first terminal equipment establishes connection with the second terminal equipment, the first identification information being used to indicate a first identifier related to the second terminal equipment.

50. The method according to supplement 49, wherein the first identification information is carried by a measurement report message.

51. The method according to supplement 50, wherein the first RRC reconfiguration message is further used to indicate a first identifier corresponding to the second identifier.

52. The method according to supplement 46, wherein the first identification information and the corresponding second identification information are carried by SUI.

53. The method according to supplement 52, wherein the first identification information and the corresponding second identification information are a newly-added information element in the SUI, or are included in a sidelink failure information element, or are included in a sidelink transmission resource request information element.

54. An information transceiving method, applicable to a second terminal equipment, characterized in that the method includes:

transmitting first identification information by the second terminal equipment to a network device, the first identification information being used to indicate a first identifier related to the second terminal equipment; and/or, receiving, by the second terminal equipment, second identification information transmitted by the network device, the second identification information being used to indicate a second identifier of the second terminal equipment.

55. The method according to supplement 54, wherein the method further includes:

transmitting the second identification information by the second terminal equipment to the first terminal equipment.

56. The method according to supplement 55, wherein the second identification information is carried by a sidelink signaling message or a sidelink RRC message between the first terminal equipment and the second terminal equipment, the sidelink signaling message or the sidelink RRC message being further used to indicate the first identifier.

57. The method according to supplement 54, wherein via a second RRC reconfiguration message, the second terminal equipment receives the second identification information transmitted by the network device.

58. The method according to supplement 54, wherein the second terminal equipment transmits the first identification information to the network device via a measurement report message.

59. An information reception method, applicable to a first terminal equipment, characterized in that the method includes:

receiving, by the first terminal equipment, second identification information transmitted by a network device, the second identification information being used to indicate a second identifier of the second terminal equipment, wherein the second terminal equipment determines to switch to being connected to the network device via the first terminal equipment.

60. The method according to supplement 59, wherein the method further includes:

receiving the second identification information transmitted by the second terminal equipment, by the first terminal equipment.

61. The method according to supplement 60, wherein the second identification information transmitted by the second terminal equipment is carried by a sidelink signaling message or a sidelink RRC message between the first terminal equipment and the second terminal equipment, the sidelink signaling message or the sidelink RRC message being further used to indicate the first identifier.

62. The method according to supplement 59, wherein the second identification information transmitted by the network device is carried by a first RRC reconfiguration message.

63. The method according to supplement 62, wherein the first RRC reconfiguration message is further used to indicate first identification information corresponding to the second identifier.

64. The method according to supplement 61 or 63, wherein the method further includes:

using or storing a correspondence between the first identifier and the second identifier by the first terminal equipment.

65. The method according to supplement 61, wherein the method further includes:

transmitting the first identification information and the corresponding second identification information by the first terminal equipment to the network device.

66. The method according to supplement 65, wherein the first identification information and the corresponding second identification information are carried by SUI.

67. The method according to supplement 66, wherein the first identification information and the corresponding second identification information are a newly-added information element in the SUI, or are included in a sidelink failure information element, or are included in a sidelink transmission resource request information element.

68. A network device, including a memory and a processor, the memory storing a computer program, wherein the processor is configured to execute the computer program to carry out the method as described in any one of supplements 17-31 and 44-53.

69. A terminal equipment, including a memory and a processor, the memory storing a computer program, wherein the processor is configured to execute the computer program to carry out the method as described in any one of supplements 1-16, 32-43 and 54-67.

70. A communication system, including a network device, a first terminal equipment and a second terminal equipment, wherein the network device is configured to execute the method as described in any one of supplements 17-31 and 44-53, the first terminal equipment is configured to execute the method as described in any one of supplements 1-16 and 59-67, and the second terminal equipment is configured to execute the method as described in any one of supplements 32-43 and 54-58.

The invention claimed is:

1. An information transmission apparatus, applicable to a network device, the apparatus comprising:

processor circuitry configured to determine to switch a Remote UE to being connected to the network device via a Relay UE;

a transmitter configured to transmit second identification information to the Relay UE, the second identification information being used to indicate a second identifier of the Remote UE, after the processor circuitry determines to switch the Remote UE to being connected to the network device via the Relay UE, and the second identifier being a local/temporary identifier of the Remote UE; and a receiver configured to receive an RRC reconfiguration complete message transmitted by the Remote UE via the Relay UE, so as to complete the Remote UE switching to being connected to the network device via the Relay UE.

2. The apparatus according to claim 1, wherein the transmitter further configured to transmit the second identification information to the Remote UE.

3. The apparatus according to claim 1, wherein the receiver is further configured to receive first identification information transmitted by the Relay UE, the first identification information being used to indicate a first identifier related to the Remote UE.

4. The apparatus according to claim 1, wherein the second identification information transmitted by the transmitter to the Relay UE is carried by a first RRC reconfiguration message, and the second identification information transmitted by the transmitter to the Remote UE is carried by a second RRC reconfiguration message.

5. The apparatus according to claim 1, wherein the receiver is further configured to receive first identification information transmitted by the Remote UE, the first identification information being used to indicate a first identifier related to the Remote UE.

6. The apparatus according to claim 4, wherein the first RRC reconfiguration message further includes first identification information being used to indicate a first identifier corresponding to the second identifier.

7. The apparatus according to claim 3, wherein the first identification information is carried by SUI or a second RRC message for the Relay UE.

8. The apparatus according to claim 7, wherein the first identification information is a newly-added information element in the SUI or the second RRC message.

9. The apparatus according to claim 3, wherein the first identifier is a L2 ID of the Remote UE.

10. The apparatus according to claim 1, wherein the local/temporary identifier is denoted by 8 bits.

11. The apparatus according to claim 4, the second RRC reconfiguration message is a switch command including related information on switching to a Relay UE.

12. The apparatus according to claim 1, wherein the receiver is further configured to receive measurement report transmitted by the Remote UE, the measurement report includes at least one candidate Relay UE ID, serving cell ID of a Relay UE and sidelink measurement result, wherein the processor circuitry is further configured to determine to switch the Remote UE to being connected to the network device via the Relay UE after receiving the measurement report.

13. An information transceiving apparatus, applicable to a Remote UE, the apparatus comprising:

a receiver configured to receive second identification information transmitted by the network device, the second identification information being used to indicate a second identifier of the Remote UE, wherein the second identifier is a local/temporary identifier of the Remote UE; and processor circuitry configured to determine to switch a Remote UE to being connected to the network device via a Relay UE and to transmit an RRC reconfiguration complete message to the network device via the Relay UE, so as to complete switching to being connected to the network device via the Relay UE.

14. The apparatus according to claim 13, wherein via a second RRC reconfiguration message, the receiver receives the second identification information transmitted by the network device.

15. The apparatus according to claim 13, further comprising:

a transmitter configured to transmit first identification information to a network device, the first identification information being used to indicate a first identification related to the Remote UE, wherein the transmitter further configured to transmit measurement report, the measurement report includes at least one candidate Relay UE ID, serving cell ID of a Relay UE and sidelink measurement result; the measurement report being used to determine to switch the Remote UE to being connected to the network device via the Relay UE by the network device.

16. An information reception apparatus, applicable to a Relay UE, the apparatus comprising:

a receiver configured to receive second identification information transmitted by a network device, the second identification information being used to indicate a second identifier of the Remote UE, the network device determining to switch the Remote UE to being connected to the network device via the Relay UE, and the second identifier being a local/temporary identifier of the Remote UE; and a transmitter configured to transmit an RRC reconfiguration complete message transmitted by the Remote UE, so as to complete the Remote UE switching to being connected to the network device via the Relay UE.

* * * * *